US008653169B2

(12) United States Patent
Jiang et al.

(10) Patent No.: US 8,653,169 B2
(45) Date of Patent: Feb. 18, 2014

(54) PROPYLENE COPOLYMERS FOR ADHESIVE APPLICATIONS

(75) Inventors: Peijun Jiang, League City, TX (US); Patrick Brant, Seabrook, TX (US); Chad E. Bernard, Baytown, TX (US); David R. Johnsrud, Humble, TX (US); Charles L. Sims, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 279 days.

(21) Appl. No.: 11/529,839

(22) Filed: Sep. 29, 2006

(65) Prior Publication Data

US 2008/0081868 A1 Apr. 3, 2008
US 2010/0179268 A9 Jul. 15, 2010

Related U.S. Application Data

(63) Continuation-in-part of application No. 10/687,508, filed on Oct. 15, 2003, now Pat. No. 7,294,681, and a continuation-in-part of application No. 10/825,380, filed on Apr. 15, 2004, now Pat. No. 7,223,822, which is a continuation-in-part of application No. 10/686,951, filed on Oct. 15, 2003, now Pat. No. 7,524,910, application No. 11/529,839, which is a continuation-in-part of application No. 10/825,635, filed on Apr. 15, 2004, now Pat. No. 7,541,402, which is a continuation-in-part of application No. 10/686,951, filed on Oct. 15, 2003, now Pat. No. 7,524,910, application No. 11/529,839, which is a continuation-in-part of application No. 10/825,349, filed on Apr. 15, 2004, now Pat. No. 7,550,528, which is a continuation-in-part of application No. 10/686,951, filed on Oct. 15, 2003, now Pat. No. 7,524,910, application No. 11/529,839, which is a continuation-in-part of application No. 10/825,348, filed on Apr. 15, 2004, now Pat. No. 7,700,707, which is a continuation-in-part of application No. 10/686,951, filed on Oct. 15, 2003, now Pat. No. 7,524,910.

(60) Provisional application No. 60/418,482, filed on Oct. 15, 2002, provisional application No. 60/460,714, filed on Apr. 4, 2003.

(51) Int. Cl.
*C09J 151/06* (2006.01)
*C09J 123/14* (2006.01)
*C09J 123/26* (2006.01)

(52) U.S. Cl.
USPC ............... 524/274; 525/74; 525/78; 526/348; 524/474; 524/481; 524/483

(58) Field of Classification Search
USPC ............... 525/74, 78; 526/348; 524/274, 474, 524/483, 481
See application file for complete search history.

(56) References Cited

U.S. PATENT DOCUMENTS

| 3,821,143 A | 6/1974 | Cluff et al. |
| 3,868,433 A * | 2/1975 | Bartz et al. ............... 525/78 |
| 3,882,065 A * | 5/1975 | Snow et al. ............... 524/347 |
| 3,954,697 A | 5/1976 | McConnell et al. ......... 526/530 |
| 3,987,122 A | 10/1976 | Bartz et al. |
| 4,120,916 A | 10/1978 | Meyer, Jr. et al. |
| 4,210,570 A | 7/1980 | Trotter et al. |
| 4,382,128 A * | 5/1983 | Li ............... 524/513 |
| 5,075,386 A * | 12/1991 | Vanderbilt ............... 525/327.3 |
| 5,231,126 A | 7/1993 | Shi et al. |
| 5,317,070 A | 5/1994 | Brant et al. |
| 5,326,639 A | 7/1994 | Leonard et al. |
| 5,455,111 A | 10/1995 | Velasquez Urey |
| 5,468,807 A | 11/1995 | Tsurutani et al. |
| 5,516,848 A | 5/1996 | Canich et al. |
| 5,530,054 A | 6/1996 | Tse et al. |
| 5,539,056 A | 7/1996 | Yang et al. |
| 5,548,014 A | 8/1996 | Tse et al. |
| 5,874,512 A | 2/1999 | Farley et al. |
| 5,986,009 A | 11/1999 | Thoen et al. |
| 5,998,039 A | 12/1999 | Tanizaki et al. |
| 6,143,825 A | 11/2000 | Beren et al. |
| 6,143,846 A | 11/2000 | Herrmann et al. |
| 6,184,327 B1 | 2/2001 | Weng et al. |
| 6,214,447 B1 | 4/2001 | Nakagawa et al. |
| 6,221,448 B1 | 4/2001 | Baetzold et al. ............ 428/35.2 |
| 6,248,832 B1 | 6/2001 | Peacock |
| 6,323,284 B1 | 11/2001 | Peacock |
| 6,342,574 B1 | 1/2002 | Weng et al. |
| 6,391,974 B1 | 5/2002 | Ogawa et al. |

(Continued)

FOREIGN PATENT DOCUMENTS

| EP | 0 442 245 | 8/1991 | |
| EP | 0527589 | 2/1993 | ............ C08L 23/10 |
| GB | 1 325 484 | 8/1973 | |
| JP | 62-119212 | 5/1987 | |
| WO | 91/07472 | 5/1991 | |
| WO | 95/10575 | 4/1995 | |
| WO | 96/23838 | 8/1996 | |
| WO | 97/15636 | 5/1997 | |
| WO | WO 98/03603 | 1/1998 | ............ C09J 123/16 |
| WO | 98/34970 | 8/1998 | |
| WO | WO 99/24516 | 5/1999 | ........... C09D 123/16 |
| WO | 00/01745 | 1/2000 | |
| WO | 00/37514 | 6/2000 | |
| WO | 01/46277 | 6/2001 | |
| WO | 02/051931 | 7/2002 | |
| WO | 03/033612 | 4/2003 | |
| WO | WO 2004/046214 | 6/2004 | ............ C08F 210/06 |
| WO | WO 2005/100501 | 10/2005 | |
| WO | WO 2005/105941 | 10/2005 | |
| WO | 2005/113622 | 12/2005 | |
| WO | WO 2007/002177 | 4/2007 | |

*Primary Examiner* — Jeffrey Mullis

(57) ABSTRACT

Disclosed herein are adhesives comprising a copolymer comprising at least 80 wt % of units derived from propylene and from about 1 to about 20 wt % of units derived from at least one $C_6$ to $C_{10}$ alpha-olefin. The copolymer has a molecular weight of less than 100,000 and a heat of fusion between about 10 and about 70 J/g. An adhesive containing the copolymer preferably exhibits at least 50% fiber tear at −18° C. and at least 50% fiber tear at +25° C. using Inland paper board as a substrate; a viscosity of less than 50,000 mPa sec at 190° C., a set time of less than 4 seconds and a toughness of at least 3.4 megajoule/m$^3$.

16 Claims, No Drawings

(56) References Cited

U.S. PATENT DOCUMENTS

| | | |
|---|---|---|
| 6,407,171 B1 | 6/2002 | Agarwal et al. |
| 6,486,246 B1 | 11/2002 | Vion |
| 6,500,563 B1 | 12/2002 | Datta et al. |
| 6,573,350 B1 | 6/2003 | Markel et al. |
| 6,573,352 B1 | 6/2003 | Tatsumi et al. |
| 6,627,723 B2 | 9/2003 | Karandinos et al. .......... 526/348 |
| 6,639,020 B1 | 10/2003 | Brant |
| 6,657,009 B2 | 12/2003 | Zhou |
| 6,660,809 B1 | 12/2003 | Weng et al. |
| 6,747,114 B2 | 6/2004 | Karandinos et al. ....... 526/348.2 |
| 6,774,069 B2 | 8/2004 | Zhou et al. |
| 6,800,700 B2 | 10/2004 | Sun |
| 6,884,846 B2 | 4/2005 | Pradel |
| 6,884,850 B2* | 4/2005 | Schauder et al. ............. 525/285 |
| 6,960,635 B2 | 11/2005 | Stevens et al. |
| 7,294,681 B2 | 11/2007 | Jiang et al. |
| 7,476,710 B2 | 1/2009 | Mehta et al. |
| 7,524,910 B2 | 4/2009 | Jiang et al. |
| 7,550,528 B2 | 6/2009 | Abhari et al. |
| 7,770,707 B2 | 8/2010 | Brees et al. |
| 2001/0007896 A1 | 7/2001 | Agarwal et al. |
| 2001/0044506 A1 | 11/2001 | Mehta et al. |
| 2001/0049331 A1 | 12/2001 | Chang |
| 2002/0007033 A1 | 1/2002 | Karandinos et al. |
| 2002/0019507 A1 | 2/2002 | Karandinos et al. |
| 2002/0039623 A1* | 4/2002 | Faissat et al. ................. 427/421 |
| 2002/0123538 A1 | 9/2002 | Zhou et al. |
| 2002/0124956 A1 | 9/2002 | Zhou |
| 2003/0065097 A1 | 4/2003 | DeGroot et al. |
| 2003/0078350 A1 | 4/2003 | Weng et al. |
| 2003/0092844 A1 | 5/2003 | Pradel |
| 2004/0038058 A1 | 2/2004 | Zhou |
| 2004/0039117 A1 | 2/2004 | Kijima |
| 2004/0048984 A1 | 3/2004 | Weng et al. |
| 2004/0054086 A1 | 3/2004 | Schauder et al. |
| 2004/0127614 A1 | 7/2004 | Jiang et al. |
| 2004/0127649 A1 | 7/2004 | Arjunan et al. |
| 2004/0138392 A1 | 7/2004 | Jiang et al. .................. 526/114 |
| 2004/0220336 A1 | 11/2004 | Abhari et al. |
| 2004/0220359 A1* | 11/2004 | Abhari et al. ................... 526/65 |
| 2004/0249046 A1* | 12/2004 | Abhari et al. ................. 524/474 |
| 2007/0021566 A1 | 1/2007 | Tse et al. |
| 2008/0081868 A1 | 4/2008 | Jiang et al. |
| 2008/0081878 A1 | 4/2008 | Jiang et al. |

* cited by examiner

PROPYLENE COPOLYMERS FOR ADHESIVE APPLICATIONS

This application is a Continuation-in-Part of U.S. Ser. No. 10/687,508, filed Oct. 15, 2003, now U.S. Pat. No. 7,294,681, which claims priority to provisional U.S. Ser. No. 60/418,482, filed Oct. 15, 2002, and also claims priority to provisional U.S. Ser. No. 60/460,714, filed Apr. 4, 2003. This application is also a continuation-in-part of U.S. Ser. No. 10/825,380; Ser. No. 10/825,635 now U.S. Pat. No. 7,541,402; Ser. No. 10/825,349 now U.S. Pat. No. 7,550,528; and Ser. No. 10/825,348 now U.S. Pat. No. 7,700,707, all filed Apr. 15, 2004, which are all continuation-in parts of U.S. Ser. No. 10/686,951, filed Oct. 15, 2003 now U.S. Pat. No. 7,524,910 which claims priority from U.S. Ser. No. 60/418,482, filed Oct. 15, 2002 and U.S. Ser. No. 60/460,714, filed Apr. 4, 2003.

BACKGROUND

One type of adhesive that finds extensive commercial utility, particularly in packaging applications, is the hot-melt adhesive, which is a material that can be heated to a melt and then applied to various substrates such that a bond is formed upon cooling and resolidification. A wide variety of thermoplastic polymers, particularly ethylene-based polymers, such as ethylene-vinyl acetate copolymers ("EVA") have been proposed for use in hot-melt adhesives but often the adhesive formulation requires substantial use of low molecular weight ingredients such as wax and tackifier to adjust the viscosity and glass transition temperature to useful ranges for hot melt adhesive applications. Where the polymers have substantial crystallinity and hence a poor compliance to substrates, this can significantly reduce their potential for use in low temperature applications. On the contrary, amorphous polymers often have poor cohesive strength and so require the presence of large concentrations of high molecular weight materials to improve cohesive strength but this leads to high melt viscosity and poor processability. Also desirable in packaging is to have adhesive compositions that exhibit a sufficiently long time before hardening to preserve sufficient adhesion (known in industry as "open time") in assembly operations such as box closures, yet a quick enough setting speed to allow shortest time application of adhering pressure (known in industry as "setting time").

Although many of the alpha-olefin copolymers currently used in adhesive compositions are derived predominantly from ethylene (see, for example, International Patent Publication Nos. WO98/03603 and WO99/24516), copolymers derived predominantly from propylene have also been proposed for use in adhesive compositions. For example, U.S. Pat. No. 3,954,697 discloses a single component, hot-melt, pressure-sensitive adhesive based on propylene/higher 1-olefin copolymers containing 40-60 mole % of the higher 1-olefin. Suitable comonomers include 1-hexene, 1-heptene, 1-octene, 1-nonene and 1-decene. The copolymer has a melt viscosity range at 190° C. of 10,000 cp to 75,000 cp, a density of 0.85 to 0.86, a glass transition temperature of −30 to −45° C., and has no melting point measurable by Differential Scanning Calorimetry. Thus the copolymer is amorphous with no residual crystallinity or crystallinity of a very low order. The copolymer is produced using a Ziegler-Natta catalyst. It is to be appreciated that a hot melt pressure sensitive adhesive (HMPSA) is an adhesive that is applied hot to a substrate to form an article, such as a tape or label, which is subsequently used at ambient temperature to initiate adhesion.

U.S. Pat. No. 6,627,723 discloses a poly-alpha olefin copolymer comprising (a) from 60 to 94 mol % of units derived from one alpha mono-olefin having from 3 to 6 carbon atoms, preferably propylene; (b) from 6 to 40 mol % of units derived from one or more other mono-olefins having from 4 to 10 carbon atoms and at least one carbon atom more than (a), preferably butene-1, hexene-1 or octene-1; and (c) optionally from 0 to 10 mol % of units derived from another copolymerizable unsaturated hydrocarbon, different from (a) and (b), preferably ethylene; wherein the diad distribution of component A in the inter-polymer as determined by $^{13}$C NMR divided by the calculated Bernoullian diad distribution is less than 1.07; and wherein the storage modulus G' of the copolymer determined on cooling, measured at 1 Hz, intersects $3\times10^5$ Pa at an intersection temperature of less than 85° C. The copolymer is produced by copolymerizing the monomers in the presence of a single site metallocene catalyst, preferably a bridged chiral bis-indenyl metallocene catalyst. The copolymer is largely amorphous and is said to be useful as a hot melt adhesive, both with and without the addition of tackifying resins.

U.S. Pat. No. 6,747,114 discloses an adhesive composition comprising a semi-crystalline copolymer of propylene and at least one comonomer selected ethylene and $C_4$ to $C_{20}$ α-olefins having a propylene content of greater than 65 mole percent; wherein the copolymer has a weight average molecular weight (Mw) from about 15,000 to about 200,000; a melt index (MI) from about 7 dg/min to about 3000 dg/min as measured by ASTM D 1238(B); and a weight average molecular weight/number average molecular weight ratio (Mw/Mn) of approximately 2. In Example 4, propylene is copolymerized with between 11 and 19 wt % 1-hexene at a temperature of 76° C. to 90° C. over a catalyst comprising dimethylsilandiylbis(2-methyl-4-phenyl-1-indenyl)zirconium dimethyl activated with dimethylanilinium-tetrakis (pentafluorophenyl)borate to produce semi-crystalline copolymers having a melting temperature, $T_m$, between 93° C. and 107° C., a heat of fusion, ΔH, between 58.5 and 96.6 J/g and a melt viscosity at 190° C. of between 2230 and 66,000 cps. Pressure sensitive hot melt adhesives are formed by blending 30 wt % of each copolymer with 50 wt % of Escorez® 5380 tackifier and 20 wt % of Kaydol Oil and the resulting adhesives exhibit a tensile strength in excess of 127 psi, an elongation in excess of 368% and a Shear Adhesion Failure Temperature (SAFT) to Kraft paper of 74° C. to 83° C. In addition, for the copolymer formed from 19 wt % 1-hexene, a hot melt adhesive is formed by blending 80 wt % of the copolymer with 15 wt % of Escorez® 5380 tackifier and 5 wt % of Kaydol Oil. The resulting adhesive exhibits a tensile strength of 1452 psi, an elongation of 768% and a Shear Adhesion Failure Temperature (SAFT) to Kraft paper of 102.5° C. All of the adhesives formed had at least 20% of the other ingredients due to the high molecular weight of the starting copolymers, and had a long set time.

International Patent Publication No. WO 2004/046214, published Jun. 3, 2004, discloses a polyolefin adhesive comprising a polymer having a Dot T-Peel of 1 N or more on Kraft paper, an Mw of 10,000 to 100,000, a branching index (g') of 0.95 or less measured at the Mz of the polymer and a heat of fusion of 1 to 70 J/g, wherein the polymer comprises 50 weight % or more of an alpha-olefin having 3 to 30 carbon atoms, and optionally up to 50 weight % of a comonomer selected from the group consisting of ethylene, butene, hexene, octene, decene, dodecene, pentene, heptene, nonene, 4-methyl-pentene-1,3-methyl pentene-1,3,5,5-trimethyl-hexene-1, and 5-ethyl-1-nonene, and up to 10 weight % of a diene. The polymer is preferably produced using a mixed catalyst system comprising a first transition metal compound capable of producing a crystalline poly-alpha-olefin, preferably isotactic or syndiotactic polypropylene, having a crystallinity of 20% or more, and a second transition metal compound capable of producing an amorphous poly-alpha-olefin, preferably atactic polypropylene, having a crystallinity of 5% or less.

In particular, Example 71 of WO 2004/046214 discloses the production of a copolymer of propylene, hexene and 1,9-decadiene by feeding propylene (14 g/minute or 81 wt %), hexene (3.29 ml/minute or 15.8 wt %) and 1,9-decadiene (0.206 ml/min) to a liquid filled, single-stage continuous reactor using a mixed metallocene solution catalyst system comprising dimethylsilylbis(2-methyl-4-phenylindenyl)zirconium dimethyl and dimethylsilyl-(tetramethylcyclopentadienyl)(cyclododecylamido)titanium dimethyl at a temperature of 115° C. The product, comprising both amorphous and semi-crystalline propylene copolymers, had a Tm of 89.8° C., a Tc of 42.6° C., a glass transition temperature, Tg, of −15.2° C., a heat of fusion of 27.0 J/g and a viscosity of 524 cp at 190° C. and, when used as an adhesive without additives, exhibited a set time of 3.5 seconds and 80% fiber tear at 20-25° C. using a file folder as a substrate. When formulated with 2 wt % of Escorez® 5637 tackifier and 5 wt % of Paraflint H1 wax, the copolymer of Example 71 provided an adhesive with a set time of 2 seconds and 90% fiber tear at 20-25° C. on a file folder substrate. However, the formulated adhesive would have no fiber tear and poor adhesion at low temperature (−18° C.) on difficult substrates such as Inland paper board.

As illustrated by the prior art cited above, the copolymers derived from either ethylene or propylene currently used in hot melt adhesives are of high molecular weight. However, high molecular weight copolymers exhibit poor processability and require high concentrations (>20%) of other low molecular weight additives, such as wax and tackifier, to reduce the adhesive viscosity to the applicable range as well as to improve other adhesive properties. It would therefore be desirable to develop adhesives using low molecular weight copolymers having the desired end-use viscosity. However, low molecular weight polymers often have poor cohesive strength. There is therefore a need for copolymers which exhibit low viscosity together with a combination of good adhesion at low and high temperatures and acceptable mechanical strength.

Certain novel propylene copolymers have been produced that, when combined with small quantities of wax and/or a functionalized polyolefin, exhibit an excellent balance of adhesive properties, including a good low temperature (−18° C.) adhesion performance, short set time and a high toughness at relatively low application viscosity.

SUMMARY

Accordingly, disclosed herein is an adhesive comprising a copolymer comprising at least 80 wt % of units derived from propylene and from about 1 to about 20 wt % of units derived from at least one $C_6$ to $C_{10}$ alpha-olefin, wherein the copolymer has a molecular weight of less than 100,000 and a heat of fusion between about 10 and about 70 J/g and wherein the adhesive has the following properties:
(a) at least 50% fiber tear at −18° C. using Inland paper board as a substrate;
(b) at least 50% fiber tear at 25° C. using Inland paper board as a substrate;
(c) a viscosity of less than 50,000 mPa sec at 190° C.;
(d) a set time of less than 4 seconds; and
(e) a toughness of at least 3.4 megajoule/m$^3$.

Preferably, the copolymer comprises about 2 wt % to about 15 wt %, more preferably about 2 wt % to about 12 wt %, of units derived from said at least one $C_6$ to $C_{10}$ alpha-olefin.

Preferably, said at least one alpha-olefin has 6 to 8 carbon atoms and more preferably comprises hexene-1.

Preferably, said copolymer has a molecular weight of less than 80,000, such as less than 50,000.

Preferably, said copolymer has a heat of fusion between about 10 and about 60 J/g, such as between about 20 and about 50 J/g.

Preferably, said copolymer has an Mw/Mn of between 4 and 9.

Preferably, said adhesive is a hot melt adhesive.

Preferably, said adhesive comprises at least 80 wt % of said copolymer and up to 20 wt % of at least one additive selected from waxes and functionalized polyolefins. In one embodiment, said at least one additive comprises a functionalized polyolefin and said functionalized polyolefin comprises up to 15 wt %, for example from 1 to 10 wt %, of the adhesive. In another embodiment, said at least one additive comprises a wax and said wax comprises up to 10 wt %, for example from 2 to 8 wt %, of the adhesive.

Preferably, said adhesive has a Shear Adhesion Fail Temperature (SAFT) of at least 100° C.

Preferably, said adhesive has a viscosity of less than 25,000 mPa sec, such as less than 10,000 mPa sec, for example less than 5,000 mPa sec, typically less than 1,000 mPa sec at 190° C.

Preferably, said adhesive has a toughness of at least 3.4 megajoule/m$^3$ when the viscosity at 190° C. is less than 1000 mPa sec; a toughness of at least 7 megajoule/m$^3$ and an elongation of at least 100% when viscosity at 190° C. is in a range from 1000 to 10,000 mPa sec; and a toughness greater than 14 megajoule/m$^3$ and an elongation of at least 400% when the viscosity at 190° C. is greater than 10,000 mPa sec.

Preferably, said adhesive has a set time of less than 3 seconds, typically less than 2 seconds.

In other embodiments, the adhesive has a Dot T-Peel adhesion of at least 8 newton for adhesion between a fiber board and a fabric substrate at room temperature and a Dot T-Peel adhesion of at least 8 newton for adhesion between two polyethylene terephthalate (PET) films at room temperature (25° C.) and at 40° C.

DETAILED DESCRIPTION

For purposes of disclosure when a polymer or oligomer is referred to as comprising an olefin, the olefin present in the polymer or oligomer is the polymerized or oligomerized form of the olefin, respectively. Likewise, the use of the term "polymer" is meant to encompass homopolymers and copolymers. The term "copolymer" is used herein to include any polymer having two or more monomers. That is, in the case of a propylene copolymer, at least one other comonomer is polymerized with the propylene to make the copolymer.

Disclosed herein is a copolymer of propylene with at least one $C_6$ to $C_{10}$ alpha-olefin, wherein the copolymer has a molecular weight of less than 100,000 and a heat of fusion between about 10 and about 70 J/g. When used as an adhesive, and in particular as a hot melt adhesive, the present copolymer exhibits a novel and advantageous combination of properties including at least 50% fiber tear at −18° C. and at least 50% fiber tear at 25° C. using Inland paper board as a substrate, a viscosity of less than 50,000 mPa sec at 190° C., a set time of less than 4 seconds and improved mechanical properties such as a toughness of at least 3.4 megajoule/m$^3$ or more when the viscosity at 190° C. is less than 1000 mPa sec; a toughness of 7 megajoule/m³ or more and an elongation of 100% or more when viscosity at 190° C. is in a range from 1000 to 10,000 mPa sec; and a toughness greater than 14 megajoule/m³ and an elongation of 400% or more when the viscosity at 190° C. is greater than 10,000 mPa sec.

Copolymer

The presently disclosed copolymer comprises at least 80%, preferably at least 85% by weight of units derived from propylene. Generally, the maximum concentration of propylene-derived units in the copolymer is 98%, preferably 95%, more preferably 90% by weight of the copolymer. In addition to propylene-derived units, the present copolymer contains from 1 to 20% by weight, preferably from about 2% to about 15% by weight, more preferably about 2% to about 12% by weight, and most preferably about 2% to about 10% by weight of units derived from at least one $C_6$ to $C_{10}$ alpha-olefin. In one preferred embodiment, the copolymer comprises about 90 wt % of propylene-derived units and about 10 wt % of units derived from said at least one $C_6$ to $C_{10}$ alpha-olefin.

Preferred $C_6$ to $C_{10}$ alpha-olefins are those having 6 to 8 carbon atoms, with the most preferred alpha-olefin being hexene-1.

The copolymer can contain small amounts, generally less than 10% by weight of units derived from other comonomers, such as ethylene, $C_4$ and $C_5$ alpha-olefins and $C_{11}$ to $C_{20}$ alpha-olefins, but preferably the copolymer consists essentially of units derived from propylene and one or more $C_6$ to $C_{10}$ alpha-olefins. In particular, the copolymer is preferably free of diolefins.

The present copolymer has a heat of fusion as determined by differential scanning calorimetry (DSC) between about 10 and about 70 J/g, for example between about 10 and about 60 J/g, such as about 20 and about 50 J/g, such as between about 20 and about 40 J/g. The copolymer typically has a melting point of less than 130° C., or preferably less than 120° C. This melting point is due to crystallizable propylene sequences, preferably of isotactic polypropylene. The semi-crystalline copolymer has stereoregular propylene sequences long enough to crystallize, preferably predominately isotactic polypropylene. The length and distribution of stereoregular propylene sequences is consistent with the substantially random statistical copolymerization. It is well known that sequence length and distribution are related to the copolymerization reactivity ratios. By substantially random, we mean copolymer for which the product of the reactivity ratios is 2 or less. In stereoblock structures, the average length of polypropylene sequences is greater than that of substantially random copolymers with a similar composition. Prior art polymers with stereoblock structure have a distribution of polypropylene sequences consistent with these blocky structures rather than a random substantially statistical distribution. The reactivity ratios and sequence distribution of the polymer can be determined by C-13 NMR which locates the comonomer residues in relation to the neighboring propylene residues. This is according to the procedures described in the article by H. Kakugo, Y Naito, K. Mizunama and T. Miyatake in Macromolecules (1982), pages 1150-1152.

The weight averaged molecular weight (Mw) of the copolymer is preferably less than 100,000 and typically less than 80,000, such as less than 50,000. In general, the weight averaged molecular weight of the copolymer is at least 5,000, such as at least 10,000. Typically, the ratio of the weight averaged molecular weight (Mw) of the copolymer to the number averaged molecular weight (Mn) of the copolymer is between 4 and 9, such as between 5 and 7. Generally, the semi-crystalline copolymer has a viscosity of less than 50,000 mPa sec, for example less than 25,000 mPa sec, such as less than 10,000 mPa sec, for example less than 5,000 mPa sec, typically less than 1,000 mPa sec measured at 190° C. using a Brookfield viscometer.

Process for Producing the Copolymer

Propylene copolymers described herein may be produced in any known polymerization process. Polymerization methods include high pressure, slurry, gas, bulk, suspension, supercritical, or solution phase, or a combination thereof, using a single-site metallocene catalyst system. The catalysts can be in the form of a homogeneous solution, supported, or a combination thereof. Polymerization may be carried out by a continuous, a semi-continuous or batch process and may include use of chain transfer agents, scavengers, or other such additives as deemed applicable. By continuous is meant a system that operates (or is intended to operate) without interruption or cessation. For example a continuous process to produce a polymer would be one where the reactants are continually introduced into one or more reactors and polymer product is continually withdrawn. In general, the propylene copolymer described herein is produced in a single polymerization zone using a single polymerization catalyst.

Preferably the copolymer is made with a polymerization catalyst which forms essentially or substantially isotactic propylene sequences. Nonetheless, the polymerization catalyst used for the production of the propylene copolymer will introduce stereo- and regio-errors in the incorporation of propylene. Stereo errors are those where the propylene inserts in the chain with a tacticity that is not isotactic. A regio error is one where the propylene inserts with the methylene group or the methyldiene group adjacent to a similar group in the propylene inserted immediately prior to it. Such errors are more prevalent after the introduction of comonomer such as 1-hexene in the semi-crystalline propylene copolymer. Notwithstanding the presence of these errors, the semi-crystalline propylene copolymer is statistically random in the distribution of comonomer.

Preferably the semi-crystalline propylene copolymer is made with a single site metallocene catalyst which allows only a single statistical mode of addition of propylene and comonomer in a well-mixed, continuous monomer feed stirred tank polymerization reactor and which allows only a single polymerization environment for all of the polymer chains of the semi-crystalline propylene copolymer.

Suitable single site metallocene catalysts for use herein include those obeying the following general formula (1):

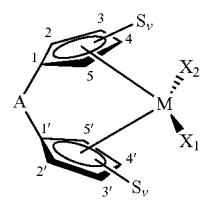

wherein
M is a Group 3, 4, 5 or 6 transition metal atom, or a lanthanide metal atom, or actinide metal atom, preferably a Group 4 transition metal atom selected from titanium, zirconium or hafnium;
each cyclopentadienyl (Cp) ring is substituted with from zero to four substituent groups S, each substituent group S being, independently, a hydrocarbyl, substituted-hydrocarbyl, halocarbyl, substituted-halocarbyl, hydrocarbyl-substituted organometalloid, halocarbyl-substituted organometalloid, disubstituted boron, disubstituted pnictogen, substituted chalcogen or halogen radical, provided that two adjacent S groups may joined to form a $C_4$ to $C_{20}$ ring to give a saturated or unsaturated polycyclic ligand;

the subscript "v" denotes the carbon atom on the Cp-ring to which the substituent is bonded;

A is a bridging group; and $X_1$ and $X_2$ are, independently, hydride radicals, hydrocarbyl radicals, substituted hydrocarbyl radicals, halocarbyl radicals, substituted halocarbyl radicals, and hydrocarbyl- and halocarbyl-substituted organometalloid radicals, substituted pnictogen radicals, or substituted chalcogen radicals; or $X_1$ and $X_2$ are joined and bound to the metal atom to form a metallacycle ring containing from about 3 to about 20 carbon atoms; or $X_1$ and $X_2$ together can be an olefin, diolefin or aryne ligand; or when Lewis-acid activators, such as methylalumoxane, which are capable of donating an $X_1$ ligand as described above to the transition metal component are used, $X_1$ and $X_2$ may independently be a halogen, alkoxide, aryloxide, amide, phosphide or other univalent anionic ligand or both $X_1$ and $X_2$ can also be joined to form a anionic chelating ligand and with the proviso that $X_1$ and $X_2$ are not a substituted or unsubstituted cyclopentadienyl ring.

Preferably, A is a bridging group containing boron or a Group 14, 15 or 16 element. Examples of suitable bridging groups include $R'_2C$, $R'_2Si$, $R'_2Ge$, $R'_2CCR'_2$, $R'_2CCR'_2CR'_2$, $R'_2CCR'_2CR'_2CR'_2$, $R'C=CR'$, $R'C=CR'CR'_2$, $R'_2CCR'=CR'CR'_2$, $R'C=CR'CR'=CR'$, $R'C=CR'CR'_2CR'_2$, $R'_2CSiR'_2$, $R'_2SiSiR'_2$, $R'_2CSiR'_2CR'_2$, $R'_2SiCR'_2SiR'_2$, $R'C=CR'SiR'_2$, $R'_2CGeR'_2$, $R'_2GeGeR'_2$, $R'_2CGeR'_2CR'_2$, $R'_2GeCR'_2GeR'_2$, $R'_2SiGeR'_2$, $R'C=CR'GeR'_2$, $R'B$, $R'_2C—BR'$, $R'_2C—BR'—CR'_2$, $R'N$, $R'P$, $O$, $S$, $Se$, $R'_2C—O—CR'_2$, $R'_2CR'_2C—O—CR'_2CR'_2$, $R'_2C—O—CR'_2CR'_2$, $R'_2C—O—CR'=CR'$, $R'_2C—S—CR'_2$, $R'_2CR'_2C—S—CR'_2CR'_2$, $R'_2C—S—CR'_2CR'_2$, $R'_2C—S—CR'=CR'$, $R'_2C—Se—CR'_2$, $R'_2CR'_2C—Se—CR'_2CR'_2$, $R'_2C—Se—CR'_2CR'_2$, $R'_2C—Se—CR'=CR'$, $R'_2C—N=CR'$, $R'_2C—NR'—CR'_2$, $R'_2C—NR'—CR'_2CR'_2$, $R'_2C—NR'—CR'=CR'$, $R'_2CR'_2C—NR'—CR'_2CR'_2$, $R'_2C—P=CR'$, and $R'_2C—PR'—CR'_2$ where R' is hydrogen or a $C_1-C_{20}$ containing hydrocarbyl, substituted hydrocarbyl, halocarbyl, substituted halocarbyl, silylcarbyl or germylcarbyl substituent and optionally two or more adjacent R' may join to form a substituted or unsubstituted, saturated, partially unsaturated or aromatic, cyclic or polycyclic substituent. Preferred examples for the bridging group Y include $CH_2$, $CH_2CH_2$, $CH(CH_3)_2$, $O$, $S$, $SiMe_2$, $SiPh_2$, $SiMePh$, $Si(CH_2)_3$ and $Si(CH_2)_4$.

Preferably transition metal compounds for producing poly-alpha-olefins having enhanced isotactic character are those of formula 1 where S are independently chosen such that the metallocene framework 1) has no plane of symmetry containing the metal center, and 2) has a $C_2$-axis of symmetry through the metal center. These complexes, such as rac-$Me_2Si(indenyl)_2ZrMe_2$ and rac-$Me_2Si(indenyl)_2HfMe_2$, are well known in the art and generally produce isotactic polymers with higher degrees of stereoregularity than the less symmetric chiral systems. Likewise another preferred class of transition metal compounds that can produce isotactic polymers useful in this invention are those monocyclopentadienyl catalysts disclosed in U.S. Pat. No. 5,026,798, which is incorporated by reference herein. A detailed description of suitable catalyst compounds and catalyst selections may be found in U.S. Published Patent Application No. 2004/0217614, published Jul. 1, 2004 which is incorporated by reference herein.

Similarly, transition metal compounds providing tacticity control exist where the S substituents of sufficient steric bulk to restrict rotation of the cyclopentadienyl ligands such that the aforementioned symmetry conditions are satisfied. Preferable chiral racemic metallocenes of this type include bis (tricyclo[5.2.1.0$^{2,6}$]deca-2,5-dienyl)zirconium and hafnium dimethyl, bis((1R)-9,9-dimethyltricyclo[6.1.1.0$^{2,6}$]deca-2,5-dienyl)zirconium dimethyl, bis(tricyclo[5.2.1.0$^{2,6}$]deca-2,5,8-trienyl)zirconium dimethyl, bis(tricyclo[5.2.2.0$^{2,6}$]un-deca-2,5,8-trienyl)zirconium and hafnium dimethyl and bis ((1R,8R)-7,7,9,9-tetramethyl[6.1.1.0$^{2,6}$]deca-2,5-dienyl) zirconium and hafnium dimethyl.

Preferably transition metal compounds for the production of poly-alpha-olefins having enhanced syndiotactic character are also those of formula 1 where S are independently chosen such that the Cp ligands have substantially different steric bulk. In order to produce a syndiotactic polymer the pattern of the groups substituted on the Cp-rings is important. Thus, by steric difference or sterically different as used herein, it is intended to imply a difference between the steric characteristics of the A and E ligands that renders each to be symmetrical with respect to the Y bridging group but different with respect to each other thereby controlling the approach of each successive monomer unit that is added to the polymer chain. The steric difference between the A and E ligands act to block the approaching monomer from a random approach such that the monomer is added to the polymer chain in the syndiotactic configuration.

Preferable transition metal compounds for the production of syndiotactic polymers are those of formula 1 where S are independently chosen such that 1) the steric difference between the A and E ligands is maximized and 2) there remains a plane of symmetry through the metal center and the $C_1$ and $C_{1'}$ carbon atoms of the Cp-rings in formula 1. Thus, complexes such as $Me_2C(\eta^5-C_5H_4)(1\text{-fluorenyl})MMe_2$ (where M=Ti, Zr, or Hf) which possess this symmetry are preferred, and generally produce the syndiotactic polymer with higher degrees of stereoregularity than similar, but less symmetric, systems. Additionally, in the above equation, 1-fluorenyl may be substituted with 3,8-di-t-butylfluorenyl, octahydrofluorenyl or 3,3,6,6,9,9,12,12-octamethyl-4,4,5,5,10,10,11,11-octahydrodibenzo[b,h]fluorene. Because pre-catalysts of this type often lose there ability to control the stereoregularity of the polymer under high temperature reaction conditions, to insure higher crystallinity in the material requires using these catalysts at lower reactor temperatures, preferably at temperatures below 80° C.

Particularly preferred transition metal compounds for producing crystalline poly-alpha-olefins are racemic metallocenes, such as rac-dimethylsiladiyl(2-isopropyl,4-phenyl-indenyl)$_2$ zirconium dichloride; rac-dimethylsiladiyl(2-isopropyl,4-[1-naphthyl]indenyl)$_2$ zirconium dichloride; rac-dimethylsiladiyl(2-isopropyl,4-[3,5-dimethylphenyl] indenyl)$_2$ zirconium dichloride; rac-dimethylsiladiyl(2-isopropyl,4-[ortho-methyl-phenyl]indenyl)$_2$ zirconium dichloride; rac-dimethylsilyl bis-(2-methyl, 4-phenylindenyl)zirconium dichloride, rac dimethylsiladlyl bis-(2-methyl, 4-napthylindenyl)zirconium dichloride, rac-dimethyl siladiyl (2-isopropyl, 4-[3,5 di-t-butyl-phenyl]indenyl)$_2$ zirconium dichloride; rac-dimethyl siladiyl(2-isopropyl, 4-[orthophe-nyl-phenyl]indenyl)$_2$ zirconium dichloride, rac-diphenylsi-ladiyl(2-methyl-4-[1-naphthyl]indenyl)$_2$ zirconium dichloride and rac-biphenyl siladiyl(2-isopropyl, 4-[3,5 di-t-butyl-phenyl]indenyl)$_2$ zirconium dichloride. Alkylated variants of these metallocenes (e.g. di-methyl instead of dichloride) are also contemplated, dictated by the choice of catalyst activation system. These and other metallocene compositions are described in detail in U.S. Pat. Nos. 6,376,407, 6,376,408, 6,376,409, 6,376,410, 6,376,411, 6,376,412, 6,376,413, 6,376,627, 6,380,120, 6,380,121, 6,380,122, 6,380,123, 6,380,124, 6,380,330, 6,380,331, 6,380,334, 6,399,723 and 6,825,372.

The transition metal compounds described above are typically activated in various ways to yield compounds having a vacant coordination site that will coordinate, insert, and polymerize olefin(s). For the purposes of this patent specification and appended claims, the terms "cocatalyst" and "activator" are used herein interchangeably and are defined to be any compound which can activate any one of the catalyst compounds described above by converting the neutral catalyst compound to a catalytically active catalyst compound cation. Non-limiting activators, for example, include alumoxanes, aluminum alkyls, ionizing activators, which may be neutral or ionic, and conventional-type cocatalysts. Preferred activators typically include alumoxane compounds, modified alumoxane compounds, and ionizing anion precursor compounds that abstract one reactive, σ-bound, metal ligand making the metal complex cationic and providing a charge-balancing noncoordinating or weakly coordinating anion.

Alumoxanes are generally oligomeric compounds containing —Al($R^1$)—O— sub-units, where $R^1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is a halide, alkoxide or amide. Mixtures of different alumoxanes and modified alumoxanes may also be used.

Alumoxanes may be produced by the hydrolysis of the respective trialkylaluminum compound. MMAO may be produced by the hydrolysis of trimethylaluminum and a higher trialkylaluminum such as tri-iso-butylaluminum. MMAO's are generally more soluble in aliphatic solvents and more stable during storage. There are a variety of methods for preparing alumoxane and modified alumoxanes, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253, 5,731,451, 5,744,656, 5,847,177, 5,854,166, 5,856,256 and 5,939,346 and European publications EP-A-0 561 476, EP-B-0 279 586, EP-A-0 594-218 and EP-B1-0 586 665, and PCT Publication Nos. WO 94/10180 and WO 99/15534, all of which are herein fully incorporated by reference. It may be preferable to use a visually clear methylalumoxane. A cloudy or gelled alumoxane can be filtered to produce a clear solution or clear alumoxane can be decanted from the cloudy solution. Another alumoxane is a modified methyl alumoxane (MMAO) cocatalyst type 3A (commercially available from Akzo Chemicals, Inc. under the trade name Modified Methylalumoxane type 3A, and disclosed in U.S. Pat. No. 5,041,584).

In addition or in place of alumoxanes, the transition metal compounds described herein can be activated ionizing or stoichiometric activator, neutral or ionic, such as tri(n-butyl) ammonium tetrakis(pentafluorophenyl)boron, a trisperfluorophenyl boron metalloid precursor or a trisperfluoronaphtyl boron metalloid precursor, polyhalogenated heteroborane anions (WO 98/43983), boric acid (U.S. Pat. No. 5,942,459) or combination thereof.

Examples of neutral stoichiometric activators include tri-substituted boron, tellurium, aluminum, gallium and indium or mixtures thereof. The three substituent groups are each independently selected from alkyls, alkenyls, halogen, substituted alkyls, aryls, arylhalides, alkoxy and halides. Preferably, the three groups are independently selected from halogen, mono or multicyclic (including halosubstituted) aryls, alkyls, and alkenyl compounds and mixtures thereof, preferred are alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). More preferably, the three groups are alkyls having 1 to 4 carbon groups, phenyl, napthyl or mixtures thereof. Even more preferably, the three groups are halogenated, preferably fluorinated, aryl groups. Most preferably, the neutral stoichiometric activator is trisperfluorophenyl boron or trisperfluoronapthyl boron.

Examples of neutral stoichiometric activators include tri-substituted boron, tellurium, aluminum, gallium and indium or mixtures thereof. The three substituent groups are each independently selected from alkyls, alkenyls, halogen, substituted alkyls, aryls, arylhalides, alkoxy and halides. Preferably, the three groups are independently selected from halogen, mono or multicyclic (including halosubstituted) aryls, alkyls, and alkenyl compounds and mixtures thereof, preferred are alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). More preferably, the three groups are alkyls having 1 to 4 carbon groups, phenyl, napthyl or mixtures thereof. Even more preferably, the three groups are halogenated, preferably fluorinated, aryl groups. Most preferably, the neutral stoichiometric activator is trisperfluorophenyl boron or trisperfluoronapthyl boron.

Ionic stoichiometric activator compounds may contain an active proton, or some other cation associated with, but not coordinated to, or only loosely coordinated to, the remaining ion of the ionizing compound. Such compounds and the like are described in European publications EP-A-0 570 982, EP-A-0 520 732, EP-A-0 495 375, EP-B1-0 500 944, EP-A-0 277 003 and EP-A-0 277 004, and U.S. Pat. Nos. 5,153,157, 5,198,401, 5,066,741, 5,206,197, 5,241,025, 5,384,299 and 5,502,124, all of which are herein fully incorporated by reference. Ionic catalysts can be prepared by reacting a transition metal compound with a neutral Lewis acid, such as $B(C_6F_6)_3$, which upon reaction with the hydrolyzable ligand (X) of the transition metal compound forms an anion, such as ([B $(C_6F_5)_3(X)]^-$), which stabilizes the cationic transition metal species generated by the reaction.

Compounds useful as an activator component in the preparation of the ionic catalyst systems used in the process of this invention comprise a cation, which is preferably a Bronsted acid capable of donating a proton, and a compatible non-coordinating anion which anion is relatively large (bulky), capable of stabilizing the active catalyst species (the Group 4 cation) which is formed when the two compounds are combined and said anion will be sufficiently labile to be displaced by olefinic diolefinic and acetylenically unsaturated substrates or other neutral Lewis bases such as ethers, nitrites and the like. Two classes of compatible non-coordinating anions have been disclosed in EPA 277,003 and EPA 277,004 published 1988: 1) anionic coordination complexes comprising a plurality of lipophilic radicals covalently coordinated to and shielding a central charge-bearing metal or metalloid core, and 2) anions comprising a plurality of boron atoms such as carboranes, metallacarboranes and boranes.

In a preferred embodiment, the stoichiometric activators include a cation and an anion component, and may be represented by the following formula:

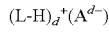

wherein

L is a neutral Lewis base;

H is hydrogen;

(L-H)$^+$ is a Bronsted acid;

A$^{d-}$ is a non-coordinating anion having the charge d–; and d is an integer from 1 to 3.

The cation component, (L-H)$_d^+$ may include Bronsted acids such as protons or protonated Lewis bases or reducible Lewis acids capable of protonating or abstracting a moiety, such as an alkyl or aryl, from the bulky ligand metallocene containing transition metal catalyst precursor, resulting in a cationic transition metal species.

The anion component A$^{d-}$ include those having the formula [M$^{k+}$Q$_n$]$^{d-}$ wherein k is an integer from 1 to 3; n is an integer from 2-6; n–k=d; M is an element selected from Group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than 1 occurrence is Q a halide. Preferably, each Q is a fluorinated hydrocarbyl group having 1 to 20 carbon atoms, more preferably each Q is a fluorinated aryl group, and most preferably each Q is a pentafluoryl aryl group. Examples of suitable A$^{d-}$ also include diboron compounds as disclosed in U.S. Pat. No. 5,447,895, which is fully incorporated herein by reference.

Illustrative, but not limiting examples of the ionic stoichiometric activator (L-H)$_d^+$ (A$^{d-}$) is N,N-dimethylanilinium tetra(perfluorophenyl)borate, N,N-dimethylanilinium tetrakis(perfluoronapthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronapthyl)borate, triphenylcarbenium tetrakis(perfluorobiphenyl)borate, triphenylcarbenium tetrakis(3,5-bis(trifluoromethyl)phenyl)borate, or triphenylcarbenium tetra(perfluorophenyl)borate.

In one embodiment, an activation method using ionizing ionic compounds not containing an active proton but capable of producing a bulky ligand metallocene catalyst cation and their non-coordinating anion are also contemplated, and are described in EP-A-0 426 637, EP-A-0 573 403 and U.S. Pat. No. 5,387,568, which are all herein incorporated by reference. The term "non-coordinating anion" (NCA) means an anion which either does not coordinate to said cation or which is only weakly coordinated to said cation thereby remaining sufficiently labile to be displaced by a neutral Lewis base. "Compatible" non-coordinating anions are those which are not degraded to neutrality when the initially formed complex decomposes. Further, the anion will not transfer an anionic substituent or fragment to the cation so as to cause it to form a neutral four coordinate metallocene compound and a neutral by-product from the anion. Non-coordinating anions useful in accordance with this invention are those that are compatible, stabilize the metallocene cation in the sense of balancing its ionic charge at +1, yet retain sufficient lability to permit displacement by an ethylenically or acetylenically unsaturated monomer during polymerization. These types of cocatalysts sometimes use tri-isobutyl aluminum or tri-octyl aluminum as a scavenger.

The polymerization process may also employ cocatalyst compounds or activator compounds that are initially neutral Lewis acids but form a cationic metal complex and a noncoordinating anion, or a zwitterionic complex upon reaction with the invention compounds. For example, tris(pentafluorophenyl) boron or aluminum act to abstract a hydrocarbyl or hydride ligand to yield an invention cationic metal complex and stabilizing noncoordinating anion, see EP-A-0 427 697 and EP-A-0 520 732 for illustrations of analogous Group-4 metallocene compounds. Also, see the methods and compounds of EP-A-0 495 375. For formation of zwitterionic complexes using analogous Group 4 compounds, see U.S. Pat. Nos. 5,624,878; 5,486,632; and 5,527,929.

The catalyst system used to produce the presently disclosed copolymers may also include a support material or carrier. For example, the catalyst component(s) and/or activator(s) may be deposited on, contacted with, vaporized with, bonded to, or incorporated within, adsorbed or absorbed in, or on, one or more supports or carriers. The support material may any of the conventional support materials. Preferably the support material is a porous support material, for example, talc, inorganic oxides and inorganic chlorides. Other support materials include resinous support materials such as polystyrene, functionalized or crosslinked organic supports, such as polystyrene divinyl benzene polyolefins or polymeric compounds, zeolites, clays, or any other organic or inorganic support material and the like, or mixtures thereof.

The polymerization process employed to produce the presently disclosed copolymers can be conducted as a solution, bulk, gas or slurry polymerization process or a combination thereof, preferably solution phase or bulk phase polymerization process.

Homogeneous solution polymerization generally involves polymerization in a continuous reactor in which the polymer formed and the starting monomer and catalyst materials supplied, are agitated to reduce or avoid concentration gradients. Suitable processes operate above the melting point of the polymers at high pressures, from 1 to 3000 bar (0.1-300 MPa), in which the monomer acts as diluent or in solution polymerization using a solvent.

Temperature control in the reactor may be obtained by balancing the heat of polymerization with reactor cooling by reactor jackets or external heat exchangers or internal cooling coils to cool the contents of the reactor, auto refrigeration, pre-chilled feeds, vaporization of liquid medium (diluent, monomers or solvent) or combinations of all three. Adiabatic reactors with pre-chilled feeds may also be used. The reactor temperature depends on the catalyst used. In general, the reactor temperature preferably can vary between about 30° C. and about 200° C., more preferably from about 90° C. to about 150° C., and most preferably from about 100° C. to about 140° C. In series operation, the second reactor temperature is preferably higher than the first reactor temperature. The pressure can vary from about 1 mm Hg to 2500 bar (250 MPa), preferably from 0.1 bar to 1600 bar (0.01-160 MPa), most preferably from 1.0 to 500 bar (0.1-50 MPa).

In one embodiment 500 ppm or less of hydrogen is added to the polymerization, or 400 ppm or less or 300 ppm or less. In other embodiments at least 50 ppm of hydrogen is added to the polymerization, or 100 ppm or more, or 150 ppm or more.

The polymerization may be conducted in a single reactor, or in parallel or series multiple reactor configurations. The liquid process comprises contacting olefin monomers with the above described catalyst systems in a suitable diluent or solvent and allowing said monomers to react for a sufficient time to produce the desired polymers. Hydrocarbon solvents are suitable, both aliphatic and aromatic. Alkanes, such as hexane(s), pentane, isopentane, cyclohexane, and octane, are preferred.

The process may be carried out in a continuous stirred tank reactor, batch reactor or plug flow reactor, or more than one reactor operated in series or parallel. These reactors may have or may not have internal cooling or heating and the monomer feed may or may not be refrigerated. See the general disclosure of U.S. Pat. No. 5,001,205 for general process conditions. See also, International Patent Publication Nos. WO 96/33227 and WO 97/22639.

Formulation of Adhesives

The copolymer produced herein can be used directly as an adhesive or can blended with other components to form an adhesive. Examples of such other components include waxes and functionalized polyolefins. However, in view of the low viscosity of the copolymer, the blends typically contain no more than 20 wt %, such as no more than 10 wt %, of such other components.

In one embodiment, the copolymer is blended with a functionalized polyolefin such that the resulting adhesive composition comprises up to 15 wt %, for example from 1 to 10 wt %, of the functionalized polyolefin. By functionalized is meant that the polymer has been contacted with an unsaturated acid or anhydride. Preferred unsaturated acids or anhydrides include any unsaturated organic compound containing at least one double bond and at least one carbonyl group. Representative acids include carboxylic acids, anhydrides, esters and their salts, both metallic and non-metallic. Preferably the organic compound contains an ethylenic unsaturation conjugated with a carbonyl group (—C=O). Examples include maleic, fumaric, acrylic, methacrylic, itaconic, crotonic, alpha.methyl crotonic, and cinnamic acids as well as their anhydrides, esters and salt derivatives. Particularly preferred functional groups include maleic acid and maleic anhydride. Maleic anhydride is particularly preferred. The unsaturated acid or anhydride is preferably present at about 0.1 weight % to about 10 weight %, preferably at about 0.5 weight % to about 7 weight %, even more preferably at about 1 to about 4 weight %, based upon the weight of the hydrocarbon resin and the unsaturated acid or anhydride. In one preferred embodiment the functionalized polyolefin is maleated polypropylene.

In another embodiment, the copolymer is blended with a wax, either alone or with a functionalized polyolefin such that the resulting adhesive composition comprises up to 10 wt %, for example from 2 to 8 wt %, of the wax. Suitable waxes include polar waxes, non-polar waxes, Fischer-Tropsch waxes, oxidized Fischer-Tropsch waxes, hydroxystearamide waxes, functionalized waxes, polypropylene waxes, polyethylene waxes, wax modifiers, and combinations thereof, In addition, tackifiers may be used with the copolymer of this invention. Examples of suitable tackifiers, include, but are not limited to, aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, hydrogenated rosin acids, and hydrogenated rosin esters. In some embodiments the tackifier is hydrogenated.

In other embodiments the tackifier is non-polar, by which is meant that the tackifier is substantially free of monomers having polar groups. Preferably the polar groups are not present, however if present, they comprise not more than 5 weight %, preferably not more than 2 weight %, even more preferably no more than 0.5 weight %, of the tackifier. In some embodiments the tackifier has a softening point (Ring and Ball, as measured by ASTM E-28) of 80° C. to 150° C., preferably 100° C. to 130° C. In another embodiment the resin is liquid and has a R and B softening point of between 10 and 70° C.

The tackifier, if present, is typically present at about 1 to about 15 weight %, such as about 2 to about 10 weight %, for example about 3 to about 5 weight %, based upon the weight of the blend.

Preferred hydrocarbon resins for use as tackifiers or modifiers include:

(a) Resins such as C5/C6 terpene resins, styrene terpenes, alpha-methyl styrene terpene resins, C9 terpene resins, aromatic modified C5/C6, aromatic modified cyclic resins, aromatic modified dicyclopentadiene based resins or mixtures thereof. Additional preferred resins include those described in WO 91/07472, U.S. Pat. No. 5,571,867, U.S. Pat. No. 5,171,793 and U.S. Pat. No. 4,078,132. Typically these resins are obtained from the cationic polymerization of compositions containing one or more of the following monomers: C5 diolefins (such as 1-3 pentadiene, isoprene, etc); C5 olefins (such as 2-methylbutenes, cyclopentene, etc.); C6 olefins (such as hexene), C9 vinylaromatics (such as styrene, alpha methyl styrene, vinyltoluene, indene, methyl indene, etc.); cyclics (such as dicyclopentadiene, methyldicyclopentadiene, etc.); and or terpenes (such as limonene, carene, etc).

(b) Resins obtained by the thermal polymerization of dicyclopentadiene, and/or the thermal polymerization of dimers or oligomers of cyclopentadiene and/or methylcyclopentadiene, optionally with vinylaromatics (such as styrene, alpha-methyl styrene, vinyl toluene, indene, methyl indene).

In yet another aspect, the adhesive composition can include 15% by weight or less, or 10% by weight or less, or 5% by weight or less of one or more additives selected from plasticizers, oils, stabilizers, antioxidants, pigments, dyestuffs, antiblock additives, polymeric additives, defoamers, preservatives, thickeners, adhesion promoters, rheology modifiers, humectants, fillers, surfactants, processing aids, cross-linking agents, neutralizing agents, flame retardants, fluorescing agents, compatibilizers, antimicrobial agents, and water.

Exemplary oils may include aliphatic naphthenic oils, white oils, and combinations thereof, for example. The phthalates may include di-iso-undecyl phthalate (DIUP), di-isononylphthalate (DINP), dioctylphthalates (DOP), combinations thereof, or derivatives thereof. Exemplary polymeric additives include homo poly-alpha-olefins, copolymers of alpha-olefins, copolymers and terpolymers of diolefins, elastomers, polyesters, block copolymers including diblocks and triblocks, ester polymers, alkyl acrylate polymers, and acrylate polymers. Exemplary plasticizers may include mineral oils, polybutenes, phthalates, and combinations thereof. Exemplary anti-oxidants include alkylated phenols, hindered phenols, and phenol derivatives, such as t-butyl hydroquinone, butylated hydroxyanisole, polybutylated bisphenol, butylated hydroxy toluene (BHT), alkylated hydroquinone, 2,6-di-tert-butyl-paracresol, 2,5-di-tert-aryl hydroquinone, octadecyl-3-(3,5-di-tert-butyl-4-hydroxy phenyl) etc.

Exemplary fillers include silica, diatomaceous earth, calcium carbonate, iron oxide, hydrogenated castor oil, fumed silica, precipitated calcium carbonate, hydrophobic treated filmed silicas, hydrophobic precipitated calcium carbonates, talc, zinc oxides, polyvinyl chloride powders, fungicides, graphite, carbon black, asphalt, carbon fillers, clay, mica, fibers, titanium dioxide, cadmium sulfide, asbestos, wood fluor, polyethylene powder, chopped fibers, bubbles, beads, thixotropes, bentonite, calcium sulfate, calcium oxide, magnesium oxide, and combinations or derivates thereof. Exemplary surfactants include vinyl-containing or mercapto-containing polyorganosiloxanes, macromonomers with vinyl terminated polydimethyl siloxane, and combinations or derivatives thereof.

Exemplary adhesion promoters include silanes, titanates, organosylane, acrylics, acids, anhydrides, epoxy resins, hardening agents, polyamides, methylacrylates, epoxies, phenolic resins, polyisobutylene, aminoalkyl, mercaptoalkyl, epoxyalkyl, ureidoalkyl, carboxy, acrylate and isocyanurate functional silanes, mercaptopropyltrimethoxysilane, glycidoxpropyltrimethoxysilane, aminopropyltriethoxysilane, aminoethylaminopropyltrimethoxysilane, ureidopropyltrimethyloxysilane, bis-gamma-trimethoxysilyl-propylurea, 1,3,5-tris-gamma-trimethoxysilylpropylisocyanurate, bis-gamma-trimethoxysilylpropylmaleate, fumarate and gamma-methacryloxypropyltrimethoxysilane, aminopropyltriethoxysilane, and combinations and derivatives thereof. Exemplary crosslinking agents include oxime crosslinkers, alkoxysilanes, epoxyalkylalkoxysilanes, amido silanes, aminosilanes, enoxysilanes, tetraethoxysilanes, methyltrimethoxy silane, vinyl trimethoxysilane, glycidoxypropyltrimethoxsilane, vinyl tris-isopropenoxysilane, methyl tris-isopropenoxysilane, methyl tris-cyclohexylaminosilane, methyl tris-secondarybutylaminosilane, polyisocyanates, and combinations or derivatives thereof. Exemplary organic solvents include aliphatic solvents, cycloaliphatic solvents, mineral spirits, aromatic solvents, hexane, cyclohexane, benzene, toluene, xylene, and combinations or derivatives thereof.

Exemplary stabilizers include hindered phenols, sulfur phenols, phosphorous-containing phenols, 1,3,5-trimethyl-2,4,6-tris(3-5-di-tert-butyl-4-hydroxybenzyl)benzene, pentaerythritol tetrakis-3(3,5-di-tert-butyl-4-hydroxyphenyl) propionate, n-octadecyl-3(3,5-di-tert-butyl-4-hydroxyphenyl) propionate, 4,4'-methylenebis(4-methyl-6-tert butylphenol), 4,4'-thiobis(6-tertbutyl-o-cresol), 2,6-di-tert-butylphenol, 6-(4-hydroxyphenoxy)-2,4-bis(n-ocytlthio)-1,3,5-triazine, 2,4,6-tris(4-hydroxy-3,5-di-tert-butyl-phenoxy)-1,3,5-triazine, di-n-octadecyl-3,5-di-tert-butyl-4-hydroxybenzylphosphonate, 2-(n-octylthio)ethyl-3,5-di-tert-butyl-4-hydroxybenzoate, sorbitol hexa-(3,3,5-di-tertbutyl-4-hydroxy-phenyl)propionate, and combinations or derivatives thereof. In one aspect, the adhesive composition includes from 0.1 to 3 percent by weight of the one or more stabilizers.

In another embodiment the copolymer produced by this invention may be blended with one or more additional polymers to produce a blend in which the present copolymer is present in an amount of from 10 to 99 weight %, preferably 20 to 95 weight %, even more preferably at least 30 to 90 weight %, even more preferably at least 40 to 90 weight %, even more preferably at least 50 to 90 weight %, even more preferably at least 60 to 90 weight %, even more preferably at least 70 to 90 weight %, based upon the total weight of the polymers in the blend. Such blends may be produced by mixing the two or more polymers together, by connecting reactors together in series to make reactor blends or by using more than one catalyst in the same reactor to produce multiple species of polymer. The polymers can be mixed together prior to being put into the extruder or may be mixed in an extruder.

Suitable polymers for producing blends with the present copolymer include elastomers (preferred elastomers include all natural and synthetic rubbers, including those defined in ASTM D1566). In a preferred embodiment elastomers are blended with the polymer produced by this invention to form rubber toughened compositions. In a particularly preferred embodiment the rubber toughened composition is a two (or more) phase system where the rubber is a discontinuous phase and the polymer is a continuous phase. Examples of preferred elastomers include one or more of the following: ethylene propylene rubber, ethylene propylene diene monomer rubber, neoprene rubber, styrenic block copolymer rubbers (including SI, SIS, SB, SBS, SIBS, SEBS, SEPS, and the like (S is styrene, I is isoprene, B is butadiene, EB is ethylenebutylene, EP is ethylenepropylene), butyl rubber, halobutyl rubber, copolymers of isobutylene and para-alkylstyrene, halogenated copolymers of isobutylene and para-alkylstyrene. This blend may be combined with the tackifiers and/or other additives as described above.

In another embodiment the copolymer produced by this invention may be blended with impact copolymers. Impact copolymers are defined to be a blend of isotactic PP and an elastomer such as an ethylene-propylene rubber. In a preferred embodiment the blend is a two (or more) phase system where the impact copolymer is a discontinuous phase and the polymer is a continuous phase.

In another embodiment the copolymer produced by this invention may be blended with ester polymers. In a preferred embodiment the blend is a two (or more) phase system where the polyester is a discontinuous phase and the polymer is a continuous phase.

In a preferred embodiment the copolymer of the invention described above are combined with metallocene polyethylenes (mPE's) or metallocene polypropylenes (mPP's). The mPE and mPP homopolymers or copolymers are typically produced using mono- or bis-cyclopentadienyl transition metal catalysts in combination with an activator of alumoxane and/or a non-coordinating anion in solution, slurry, high pressure or gas phase. The catalyst and activator may be supported or unsupported and the cyclopentadienyl rings may be substituted or unsubstituted. Several commercial products produced with such catalyst/activator combinations are commercially available from ExxonMobil Chemical Company in Baytown, Tex. under the tradenames EXCEED™, ACHIEVE™ and EXACT™. For more information on the methods and catalysts/activators to produce such mPE homopolymers and copolymers see WO 94/26816; WO 94/03506; EPA 277,003; EPA 277,004; U.S. Pat. No. 5,153,157; U.S. Pat. No. 5,198,401; U.S. Pat. No. 5,240,894; U.S. Pat. No. 5,017,714; CA 1,268,753; U.S. Pat. No. 5,324,800; EPA 129,368; U.S. Pat. No. 5,264,405; EPA 520,732; WO 92 00333; U.S. Pat. No. 5,096,867; U.S. Pat. No. 5,507,475; EPA 426 637; EPA 573 403; EPA 520 732; EPA 495 375; EPA 500 944; EPA 570 982; WO91/09882; WO94/03506 and U.S. Pat. No. 5,055,438.

Adhesive compositions containing the copolymers described herein exhibit a novel and advantageous balance of properties including: at least 50% fiber tear at −18° C. and at least 50% fiber tear at 25° C. using Inland paper board as a substrate, a set time of less than 4 seconds, a viscosity of less than 50,000 mPa sec at 190° C. and a toughness of greater than 3.4 megajoule/m$^3$ when the viscosity at 190° C. is less than 1000 mPa sec; a toughness of greater than 7 megajoule/m$^3$ and an elongation of 100% or more when viscosity at 190° C. is in a range from 1000 to 10,000 mPa sec; and a toughness of greater than 14 megajoule/m$^3$ and an elongation of 400% or more when the viscosity at 190° C. is greater than 10,000 mPa sec.

In preferred embodiments, the adhesive compositions have a Shear Adhesion Fail Temperature (SAFT) of at least 100° C., a viscosity of less than 25,000 mPa sec, such as less than 10,000 mPa sec, for example less than 5,000 mPa sec, typically less than 1,000 mPa sec at 190° C., and a set time of less than 3 seconds, typically less than 2 seconds.

In other embodiments, the adhesive compositions have a Dot T-Peel adhesion of at least 8 newton for adhesion between a fiber board and a fabric substrate at room temperature (25° C.) and a Dot T-Peel adhesion of at least 8 newton for adhesion between two polyethylene terephthalate (PET) films at room temperature (25° C.) and at 40° C.

In order to measure set time, Dot T-Peel and substrate fiber tear, adhesive test specimens were created by bonding the substrates together with a dot of about 0.3 grams of molten adhesive and compressing the bond with a 500-gram weight. The dot size was controlled by the adhesive volume such that in most cases the compressed disk which formed gave a uniform circle just inside the dimensions of the substrates.

Once a construct has been produced it can be subjected to various insults in order to assess the effectiveness of the bond. Once a bond to a substrate fails a simple way to quantify the effectiveness of the adhesive is to estimate the area of the adhesive dot that retained substrate fibers as the construct failed along the bond line. This estimate is called percent substrate fiber tear. An example of good adhesion, after conditioning a sample for 15 hours at −12° C. and attempting to destroy the bond, would be an estimate of 80-100% substrate fiber tear. It is likely that 0% substrate fiber tear under those conditions would signal a loss of adhesion.

Substrate fiber tear: The specimens were prepared using the same procedure as that described above. For low temperature fiber tear test, the bond specimens were placed in a freezer or refrigerator to obtain the desired test temperature. For substrate fiber tear at room temperature, the specimens were aged at ambient conditions. The bonds were separated by hand and a determination made as to the type of failure observed. The amount of substrate fiber tear is expressed herein as a percentage. All the fiber tear tests were conducted using inland paper board as the substrate. Inland Paper Board is a high performance box board obtained from Inland Paper Board and Packaging Company of Rome, Ga. It is characterized as a #56 virgin high performance paper board stock.

Set time is defined as the time it takes for a compressed adhesive substrate construct to fasten together enough to give substrate fiber tear when pulled apart, and thus the bond is sufficiently strong to remove the compression. The bond will likely still strengthen upon further cooling, however, it no longer requires compression. These set times were measured by placing a molten dot of adhesive on to a file folder substrate taped to a flat table. A file folder tab (1 inch by 3 inch (2.5 cm×7.6 cm) was placed upon the dot 3 seconds later and compressed with a 500-gram weight. The weight was allowed to sit for about 0.5 to about 10 seconds. The construct thus formed was pulled apart to check for a bonding level good enough to produce substrate fiber tear. The set time was recorded as the minimum time required for this good bonding to occur. Standards were used to calibrate the process.

Dot T-Peel was determined according to ASTM D 1876, except that the specimen was produced by combining two 1 inch by 3 inch (2.54 cm×7.62 cm) substrate cut outs with a dot of adhesive with a volume that, when compressed under a 500 gram weight occupied about 1 square inch of area (1 inch=2.54 cm). Once made all the specimens were pulled apart in side-by-side testing (at a rate of 2 inches per minute) by a machine (such as an Instron) that records the destructive force of the insult being applied. The maximum force achieved for each sample tested was recorded and averaged, thus producing the Average Maximum Force, which is reported as the Dot T-Peel.

Peel Strength (modified ASTM D1876): Substrates (1×3 inches (25×76 mm)) were heat sealed with adhesive film (5 mils (130 µm) thickness) at 135° C. for 1 to 2 seconds and 40 psi (0.28 MPa) pressure. Bond specimens were peeled back in a tensile tester at a constant crosshead speed of 2 in/min (51 mm/min). The average force required to peel the bond (5 specimens) apart was recorded.

Open time is determined according to ASTM D4497

Shore A hardness was measured according to ASTM 2240. An air cooled dot of adhesive was subjected to the needle and the deflection was recorded from the scale.

Adhesive melt viscosity and viscosity profiles vs. temperature were measured using a Brookfield digital viscometer and a number 27 spindle according to ASTM D-3236.

SAFT (modified ASTM D 4498-00) measures the ability of a bond to withstand an elevated temperature rising at 10° F. (5.5° C.)/15 min., under a constant force that pulls the bond in the shear mode. Bonds were formed in the manner described above on Kraft paper (1 inch by 3 inch (2.5 cm×7.6 cm)). The test specimens were suspended vertically in an oven at room temperature with a 500-gram load attached to the bottom. The temperatures at which the weight fell were recorded (when the occasional sample reached temperatures above the oven capacity >265° F. (129° C.) it was terminated and averaged in with the other samples at termination temperature).

Peel Adhesion Failure Temperature (PAFT) was determined using following procedure modified according to the procedure of TAPPI T814 PM-77. Two sheets of 6"×12" Kraft paper were laminated together with a one inch strip of molten adhesive heated to 177° C. The laminated sheet was trimmed and cut into 1-inch wide strips. These strips were placed in an oven with a 100-gram of weight hanging in a peel mode. The over temperature increased at a rate of 30° C. per hour. The samples were hung from a switch that trips when the samples fail to record the temperature of failure.

Cloud point is determined by heating the adhesive blends to 121° C. and applying a small bead (approximately 1 gram) of the molten adhesive to the bulb of an ASTM thermometer. The temperature at which the molten adhesive clouds over is then noted. These measures of cloud point provide an indication of a hot melt's overall compatibility, i.e., the compatibility of the individual ingredients with each other.

Plaques suitable for physical property testing were compression molded on a Carver hydraulic press. 6.5 g of polymer was molded between brass plates (0.05" thick) lined with Teflon coated aluminum foil. A 0.033" thick chase with a square opening 4"×4" was used to control sample thickness. After one minute of preheat at 170° C., under minimal pressure, the hydraulic load was gradually increased to ~10,000-15,000 lbs., at which it was held for three minutes. Subsequently the sample and molding plates were cooled for three minutes under ~10,000 to 15,000 lbs. load between the water cooled platens of the press. Plaques were allowed to equilibrate at room temperature for a minimum of two days prior to physical property testing.

Dog bones for tensile testing were cut from compression molded plaques using a mallet handle die. Specimen dimensions were those specified in ASTM D 1708 unless otherwise noted. Tensile properties were measured on an Instron™ model 4502 equipped with a 22.48 lb. load cell and pneumatic jaws fitted with serrated grip faces. Deformation was performed at a constant crosshead speed of 5.0 in/min with a data sampling rate of 25 points/second. Jaw separation prior to testing was 0.876", from which strains were calculated assuming affine deformation. Initial modulus, stress and strain at yield (where evident), peak stress, tensile strength at break, and strain at break were calculated. A minimum of five specimens from each plaque was tested, the results being reported as the average value. All stresses quoted were calculated based upon the original cross-sectional area of the specimen, taking no account of reduced cross-section as a function of increasing strain. Tensile strength is defined as the maximum tensile stress. Toughness is defined as the ability of polymer to absorb applied energy. The area under the stress-strain curve is used as a measure of the toughness.

The color of polymers and their blends was measured using Gardner index (Gardner color scale) according to ASTM D 1544-04. Gardner Delta 212 color comparator was used. The samples were melted at a set temperature and aged for a specified period of time prior to measurement.

End-Uses

The adhesives of this invention can be used in any adhesive application, including but not limited to, disposables, packaging, laminates, pressure sensitive adhesives, tapes, labels, wood binding, paper binding, non-wovens, road marking, reflective coatings, and the like.

The adhesives described above may be applied to any substrate. Preferred substrates include wood, paper, cardboard, plastic, thermoplastic, rubber, metal, metal foil (such as aluminum foil and tin foil), metallized surfaces, cloth, non-wovens (particularly polypropylene spun bonded fibers or non-wovens), spunbonded fibers, cardboard, stone, plaster, glass (including silicon oxide ($SiO_x$) coatings applied by evaporating silicon oxide onto a film surface), foam, rock, ceramics, films, polymer foams (such as polyurethane foam), substrates coated with inks, dyes, pigments, PVDC and the like or combinations thereof.

Additional preferred substrates include polyethylene, polypropylene, polyacrylates, acrylics, polyethylene terephthalate, or any of the polymers listed above as suitable for blends. Any of the above substrates, and/or the polymers of this invention, may be corona discharge treated, flame treated, electron beam irradiated, gamma irradiated, microwaved, or silanized.

In a particular embodiment, the adhesives of this invention can be used in a packaging article. The packaging article may be useful as a carton, container, crate, case, corrugated case, or tray, for example. More particularly, the packaging article may be useful as a cereal product, cracker product, beer packaging, frozen food product, paper bag, drinking cup, milk carton, juice carton, drinking cup, or as a container for shipping produce, just to name a few exemplary uses.

The packaging article is formed by applying an adhesive composition to at least a portion of one or more packaging elements. The packaging elements may be formed from paper, paperboard, containerboard, tagboard, corrugated board, chipboard, kraft, cardboard, fiberboard, plastic resin, metal, metal alloys, foil, film, plastic film, laminates, sheeting, or any combination thereof. In one aspect, the adhesive composition may be used to bind or bond two or more packaging elements together wherein the packaging elements are formed from the same or different type of materials. Accordingly, the packaging elements may be individually formed from paper, paperboard, containerboard, tagboard, corrugated board, chipboard, kraft, cardboard, fiberboard, plastic resin, metal, metal alloys, foil, film, plastic film, laminates, sheeting, or any combination thereof. The one or more packaging elements may also be individually coated using paper, foil, metal, metal alloys, polyethylene, polypropylene, polyester, polyethylene terephthalate, polyvinyl chloride, polyvinylidine chloride, polyvinyl acetate, polyamides, homopolymers thereof, and combinations and copolymers thereof.

When used in a packaging adhesive application, the present propylene copolymer typically has a viscosity of less than 1500 mPa·sec at 190° C. as measured using Brookfield digital viscometer; a tensile strength of at least 200 psi, preferably at least 400 psi, more preferably at least 600 psi; an elongation of at least 30%, preferably at least 80%, more preferably at least 120%; and a toughness of 3.4 megajoule/$m^3$ or more.

The adhesive composition may also be formulated to have a viscosity of less than 1000 mPa·sec at 190° C. as measured using Brookfield digital viscometer; has tensile strength of at least 300 psi, preferably at least 500 psi, more preferably at least 700 psi; has an elongation of at least 30%, preferably at least 80%, more preferably at least 120%.

The adhesive composition may also be formulated to have fiber tear of greater than 80% at room temperature, and have fiber tear of greater than 80% at −18° C., and have fiber tear of greater than 80% at 20° C. All the fiber tear should be tested on inland paper board. The adhesive composition is also formulated to have a set time of less than 4 seconds, preferably less than 3 seconds, more preferably less than 2 seconds.

The formulated adhesive composition may also has a PAFT of at least 60° C., preferably at least of 80° C. The adhesive composition also have a SAFT of at least 70° C., preferably at least of 100° C. The cloud point of the adhesive composition is 275° C. or less, preferably 130° C. or less.

One formulation of the adhesive composition comprises at least 80 percent by weight of the copolymer of the present invention, up to 10 percent by weight of one or more tackifiers, up to 10 percent by weight of one or more waxes, and up to 15 percent by weight of one or more additives. Another typical formulation of the adhesive composition comprises at least 85 percent by weight of the polymer of the present invention, up to 5 percent by weight of one or more tackifiers, up to 5 percent by weight of one or more waxes, up to 10 percent by weight of functionalized polyolefin and up to 15 percent by weight of one or more additives. Yet another typical formulation of the adhesive composition comprises at least 90 percent by weight of the polymer of the present invention, up to 5 percent by weight of one or more tackifiers, up to 5 percent by weight of one or more waxes, up to 10 percent by weight of functionalized polyolefin and up to 10 percent by weight of one or more additives.

In a particular embodiment, the adhesives of this invention can be used in disposable articles. As used herein, "disposable articles" refer to articles that are not meant for extended use. A typical life span of a disposable article can be a single use for any given period of time to multiple uses that last from seconds to days, to even weeks or longer periods of use. Typically, disposable articles are formed by attaching a first disposable element to at least a portion of a second disposable element using an adhesive composition. Disposable elements may be formed from nonwoven fabrics, nonwoven webs, non-elastic nonwoven fabrics, elastic nonwoven fabrics, necked-bonded laminates, stretch-bonded laminates, spunbond-meltblown-spunbond laminates, polypropylene spunbonded layers, polyethylene layers, combination polyethylene and polypropylene spunbonded layers, elastic strands, styrene-isoprene-styrene, styrene-butadiene-styrene, styrene-ethylene/propylene-styrene, styrene-co-butadiene-styrene, polyurethane, woven fabrics, polypropylene, polyester, body fluid impermeable backsheets, body fluid impermeable layers, body fluid permeable layers, body fluid permeable covers, absorbents, tissues, elastomeric materials, superabsorbent polymers, polyolefin films, polyester films, polyvinylchloride films, polyvinylidine chloride films, polyvinyl acetate films, elastic attachment tape, frontal tape backing, wood, paper, barrier films, film laminates, nonwoven composites, textile materials, woven materials, durable fabrics, absorbents, elastomeric strands, elastomeric webs, tissues, films, coverstock materials, nonwoven polyethylene, perforated polyethylene, superabsorbent polymers, filaments, porous webs, fibers, loop fastener material, spunbonded nonwovens, liners, elastic side panels, fastening tape, elastic bands, rayon, nylon, cellulosic pulp, cellulosic fluff, superabsorbent batts, or combinations thereof. The disposable elements may have any thickness and may vary across a cross-section thereof, depending on its intended uses. In some aspects, the thicknesses may range from microns to meters. Preferred thicknesses range from microns to millimeters.

Exemplary disposable articles may include diapers, training pants, sanitary napkins, panty liners, incontinent wear, bed pads, surgical gowns, surgical drapes, rodent traps, hook and loop fasteners, garments, medical garments, swimwear, or combinations thereof.

The propylene copolymer for disposable adhesive applications preferably has a viscosity of less than 10,000 mPa·sec at 190° C. as measured using Brookfield digital viscometer; has tensile strength of at least 800 psi, preferably at least 1,000 psi, more preferably at least 1,200 psi; has an elongation of at least 100%, preferably at least 200%, more preferably at least 300%; and has a toughness of 3.4 megajoule or more.

The adhesive composition is preferably also formulated to have a viscosity of less than 10,000 mPa·sec at 190° C. as measured using Brookfield digital viscometer; has tensile strength of at least 1,000 psi, preferably at least 1,500 psi, more preferably at least 2,000 psi; have an elongation of at least 100%, preferably at least 200%, more preferably at least 300%.

The adhesive composition is preferably formulated to have a PAFT of 30° C. or more, and preferably a PAFT of from 30° C. to 110° C. The adhesive composition also has a SAFT of 50° C. or more, and preferably up to 200° C.

Furthermore, the adhesive composition used in the disposable article preferably has a peel strength (as measured according to ASTM D 1876) of from 90 to 625 g/cm or from 265 to 625 g/cm or from 15 to 450 g/cm. In another embodiment the peel strength of the adhesive composition is 90 to 1000 g/cm, alternately 200 to 900 g/cm.

In another embodiment, the adhesive composition has a creep resistance of from 70% to 95% at 38° C.

In one embodiment, the disposable article is a diaper having two different types of adhesive compositions. The first adhesive composition can be an elastic attachment type adhesive and the second type of adhesive can be a construction type adhesive, sometimes referred to as a core and chassis adhesive. It is advantageous to utilize one adhesive composition for both the elastic attachment adhesive and the construction adhesive because the use of two adhesives on the same diaper poses problems for the diaper manufacturer, which must ensure that the right adhesive is used in the correct melt tank and is applied to the correct place on the diaper. Accordingly, an adhesive that is capable of performing both types of bonding functions is highly desirable.

Elastic attachment adhesives bond elastic materials to disposable elements. Diapers have elastic bands on the legs and/or the waist of the diaper, and typically include a disposable element such as an elastic band attached to a second disposable element, which is the portion of the diaper forming the leg opening or waist. The adhesive composition is used to attach the elastic band to the second disposable element, which is usually a fluid-impermeable barrier layer. An elastic attachment adhesive primarily exhibits high creep resistance to ensure that the elastic, when under stress, does not move relative to the surface of the second disposable element or become partially or fully detached. Should the elastic move or become detached, the resulting loss of fit could result in inconvenience, waste, embarrassment, discomfort, and associated health and safety problems.

In particular, elasticized areas can be formed by adhesively bonding non-elastic nonwoven fabrics together with at least one elastic strand disposed in the middle. In such a process, the elasticized area is a laminated structure including a nonwoven substrate, at least one elastic strand and a hot-melt adhesive composition, which binds the nonwoven substrate and the at least one elastic strand to one another. The nonwoven substrate is selected from the group consisting of a necked-bonded laminate, a stretch-bonded laminate, a spunbond-meltblown-spunbond laminate, a polypropylene spunbonded layer, and a polyethylene layer in combination with a polypropylene spunbonded layer, or a combination thereof. The elastic strand is selected from the group comprising styrene-isoprene-styrene, styrene-butadiene-styrene, styrene-ethylene/propylene-styrene, styrene/ethylene-co-butadiene/styrene, polyurethane, and combinations thereof.

Another method of forming the elasticized areas includes adhesively bonding an elastic nonwoven fabric together with a non-elastic nonwoven fabric. In such a process, a hot-melt adhesive composition binds a first nonwoven elastic substrate and a second nonwoven substrate to one another. The first nonwoven elastic substrate is selected from the group including a necked-bonded laminate, a stretch-bonded laminate, a polypropylene spunbonded layer, a polyethylene layer in combination with a polypropylene spunbonded layer, a styrene-isoprene-styrene strand, a styrene-butadiene-styrene strand, a styrene-ethylene/propylene-styrene strand, a styrene/ethylene-co-butadiene/styrene strand, and a polyurethane strand. The second nonwoven substrate is selected from the group including a necked-bonded laminate, a stretch-bonded laminate, a spunbond-meltblown-spunbond laminate, a polypropylene spunbonded layer, a polyethylene layer in combination with a polypropylene spunbonded layer, a styrene-isoprene-styrene strand, a styrene-butadiene-styrene strand, a styrene-ethylene/propylene-styrene strand, a styrene/ethylene-co-butadiene/styrene strand, and a polyurethane strand.

Elastic attachment adhesives preferably function at body temperature under high peel stress or high shear stress for long periods of time, so that the adhesives should exhibit high peel strength and high shear strength.

The propylene copolymer for elastic attachment adhesive applications preferably has a viscosity in a range of 2000 to 25,000 mPa·sec at 190° C. as measured using Brookfield digital viscometer; has tensile strength of at least 800 psi, preferably at least 1,000 psi, more preferably at least 1,200 psi; has an elongation of at least 200%, preferably at least 400%, more preferably at least 600%; and has a toughness of 7 megajoule or more.

The adhesive composition is also preferably formulated to have a viscosity of less than 25,000 mPa·sec at 190° C. as measured using Brookfield digital viscometer; has tensile strength of at least 1,000 psi, preferably at least 1,500 psi, more preferably at least 2,000 psi; have an elongation of at least 400%, preferably at least 600%, more preferably at least 800%.

In a particular embodiment, the adhesives described herein can be used in woodworking processes. A woodworking process involves forming a woodworking article by applying an adhesive composition to at least a portion of a structural element. The structural element can include a variety of materials, which include, but are not limited to wood or plywood, or plastic or veneer. For example, the structural element can also include lumber, wood, fiberboard, plasterboard, gypsum, wallboard, plywood, PVC, melamine, polyester, impregnated paper and drywall. A woodworking process can be used to form indoor furniture, outdoor furniture, trim, molding, doors, sashes, windows, millwork and cabinetry, for example.

The propylene copolymer for woodworking adhesive applications preferably has a viscosity of less than 25,000 mPa sec at 190° C. as measured using Brookfield digital viscometer; has tensile strength of at least 800 psi (5520 kPa), preferably at least 1,000 psi (6.89 MPa), more preferably at least 1,200 psi (8.27 MPa); has an elongation of at least 200%, preferably at least 400%, more preferably at least 600%, and has a toughness of 7 megajoule or more.

The adhesive composition is also preferably formulated to have a viscosity of less than 25,000 mPa sec at 190° C. as measured using Brookfield digital viscometer; has tensile strength of at least 1,000 psi (6.89 MPa), preferably at least 1,500 psi (10.34 MPa), more preferably at least 2,000 psi (13.79 MPa); have an elongation of at least 200%, preferably at least 400%, more preferably at least 600%.

In yet another aspect, the adhesive composition has an open time of 3 seconds or more. Preferably, the adhesive composition has an open time of 20 seconds or more. More preferably, the adhesive composition has an open time of 60 seconds or more. In another aspect, the adhesive composition has a set time of 5 minute or less, preferably 3 minutes or less, more preferably 2 minutes or less.

One typical formulation of the adhesive composition includes at least 70 percent by weight of the copolymer of the present invention, up to 10 percent by weight of one or more functionalized polyolefins, up to 10 percent by weight of one or more waxes, up to 15 percent by weight of one or more tackifiers, and up to 10 percent by weight of one or more additives.

The invention will now be more particularly described with reference to the following non-limiting Examples.

In the Examples, the hexene-1 content was determined using C-13 NMR. In preparation of a polymer for C-13 NMR analysis about 0.2-0.3 grams of polymer was dissolved in about 3 ml of deuterated tetrachloroethane in a 10-mm diameter NMR tube at about 120° C., then the sample solution was placed into a NMR spectrometer with the probe temperature set to 120° C. Spectral data was collected for at least four hours using an observe pulse angle of less than 90 degrees, ungated proton decoupling and a delay time long enough to allow adequate quantification of the NMR signals of interest. Interpretation of the data is based in part on peak assignments provided by Kissin and Brandolini (Macromolecules, 24, 2632, (1991)), Folini, et al., (Macromol. Chem. Phys., 201, 401 (2000)) and Resconi, et al., (Chem. Rev., 100, 1253, (2000). Instrument measured integral intensities were used to determine sample composition.

Melting point (Tm), peak crystallization temperature (Tc), heat of fusion (Hf) and percent crystallinity were determined by differential scanning calorimetry (DSC) by the following procedure according to ASTM E 794-85 using a TA Instruments model 2910 machine or a Perkin-Elmer DSC 7 machine. Prior to the DSC measurement, the samples are aged (typically by holding at ambient temperature for a period up to about 2 days) or annealed to maximize the level of crystallinity. Samples weighing approximately 5-10 mg are sealed in aluminum sample pans. The DSC data are recorded by first cooling the sample to −50° C. and then gradually heating it to 200° C. at a rate of 10° C./minute. The sample is kept at 200° C. for 5 minutes before a second cooling-heating cycle is applied. Both the first and second cycle thermal events are recorded. Areas under the melting curves are measured and used to determine the heat of fusion and the degree of crystallinity. The percent crystallinity (X %) is calculated using the formula, X %=[area under the curve (Joules/gram)/B (Joules/gram)]*100, where B is the heat of fusion for the homopolymer of the major monomer component. These values for B are to be obtained from the Polymer Handbook, Fourth Edition, published by John Wiley and Sons, New York 1999. A value of 189 J/g (B) is used as the heat of fusion for 100% crystalline polypropylene. The melting temperature is measured and reported during the second heating cycle (or second melt). Typically, a sample of propylene copolymer will show secondary melting peaks adjacent to the principal peak, which peaks are considered together as a single melting point. The highest of these peaks is considered the melting point.

Molecular weights (number average molecular weight (Mn), weight average molecular weight (Mw), and z-average molecular weight (Mz)) were determined using a Waters 150 Size Exclusion Chromatograph (SEC) equipped with a differential refractive index (DRI) detector, an online low angle light scattering (LALLS) detector and a viscometer (VIS). The details of these detectors as well as their calibrations have been described by, for example, T. Sun, P. Brant, R. R. Chance, and W. W. Graessley, in *Macromolecules*, Volume 34, Number 19, 6812-6820, (2001), incorporated herein by reference. Solvent for the SEC experiment was prepared by adding 6 grams of butylated hydroxy toluene (BHT) as an antioxidant to a 4 liter bottle of 1,2,4 trichlorobenzene (TCB) (Aldrich Reagent grade) and waiting for the BHT to solubilize. The TCB mixture was then filtered through a 0.7 micron glass pre-filter and subsequently through a 0.1 micron Teflon filter. There was an additional online 0.7 micron glass pre-filter/0.22 micron Teflon filter assembly between the high pressure pump and SEC columns. The TCB was then degassed with an online degasser (Phenomenex, Model DG-4000) before entering the SEC. Polymer solutions were prepared by placing dry polymer in a glass containter, adding the desired amount of TCB, then heating the mixture at 160° C. with continuous agitation for about 2 hours. All quantities were measured gravimetrically. The TCB densities used to express the polymer concentration in mass/volume units were 1.463 g/ml at room temperature and 1.324 g/ml at 135° C. The injection concentration ranged from 1.0 to 2.0 mg/ml, with lower concentrations being used for higher molecular weight samples.

The branching index in the Examples was measured using SEC with an on-line viscometer (SEC-VIS) and is reported as g' at each molecular weight in the SEC trace. The branching index g' is defined as:

$$g' = \frac{\eta_b}{\eta_l}$$

where $\eta_b$ is the intrinsic viscosity of the branched polymer and $\eta_l$ is the intrinsic viscosity of a linear polymer of the same viscosity-averaged molecular weight ($M_v$) as the branched polymer. $\eta_l = KM_v^\alpha$, K and α were measured values for linear polymers and should be obtained on the same SEC-DRI-LS-VIS instrument as the one used for branching index measurement. For polypropylene samples presented in this invention, K=0.0002288 and α=0.705 were used. The SEC-DRI-LS-VIS method obviates the need to correct for polydispersities, since the intrinsic viscosity and the molecular weight were measured at individual elution volumes, which arguably contain narrowly dispersed polymer. Linear polymers selected as standards for comparison should be of the same viscosity average molecular weight, monomer content and composition distribution. Linear character for polymer containing C2 to C10 monomers is confirmed by Carbon-13 NMR using the method of Randall (Rev. Macromol. Chem. Phys., C29 (2&3), p. 285-297). Linear character for C11 and above monomers is confirmed by GPC analysis using a MALLS detector. For example, for a copolymer of propylene, the NMR should not indicate branching greater than that of the co-monomer (i.e. if the comonomer is butene, branches of greater than two carbons should not be present). For a homopolymer of propylene, the GPC should not show branches of more than one carbon atom. When a linear standard is desired for a polymer where the comonomer is C9 or more, one can refer to T. Sun, P. Brant, R. R. Chance, and W. W. Graessley, *Macromolecules*, Volume 34, Number 19, 6812-6820, (2001) for protocols on determining standards for those polymers. In the case of syndiotactic polymers, the standard should have a comparable amount of syndiotacticty as measured by Carbon 13 NMR. The viscosity averaged g' was calculated using the following equation:

$$g'_{vis} = \frac{\sum C_i [\eta_i]_b}{\sum C_i K M_i^\alpha}$$

where $C_i$ is the polymer concentration in the slice i in the polymer peak, and $[\eta_i]_b$ is the viscosity of the branched polymer in slice i of the polymer peak, and $M_i$ is the weight averaged molecular weight in slice i of the polymer peak measured by light scattering, K and α are as defined above.

Example 1

All polymerizations were performed in a liquid filled, single-stage continuous reactor using mixed metallocene catalyst systems. The reactor was a 0.5-liter stainless steel autoclave reactor and was equipped with a stirrer, a water cooling/steam heating element with a temperature controller, and a pressure controller. Solvents, propylene, and comonomers (such as 1-hexene and 1-octene) were first purified by passing through a three-column purification system. The purification system consisted of an Oxiclear column (Model #RGP-R1-500 from Labelear) followed by a 5A and a 3A molecular sieve columns. Purification columns were regenerated periodically whenever there was evidence of lower activity of polymerization. Both the 3A and 5A molecular sieve columns were regenerated in-house under nitrogen at a set temperature of 260° C. and 315° C., respectively. The molecular sieve material was purchased from Aldrich. Oxiclear column was regenerated in the original manufacture. The purified solvents and monomers were then chilled to about −15° C. by passing through a chiller before being fed into the reactor through a manifold. Solvent and monomers were mixed in the manifold and fed into reactor through a single tube. All liquid flow rates were measured using Brooksfield mass flow meters or Micro-Motion Coriolis-type flow meters.

The catalyst was rac-dimethylsilylbis(2-methyl-4-phenyl-indenyl) zirconium dimethyl (obtained from Albemarle) pre-activated with N,N-dimethylanilinium tetrakis(pentafluorophenyl)borate (obtained from Albemarle) at a molar ratio of about 1:1 in toluene. The catalyst solution was kept in an inert atmosphere with <1.5 ppm water content and was fed into reactor by a metering pump through a separated line. Catalyst and monomer contacts took place in the reactor.

As an impurity scavenger, 250 ml of tri-n-octyl aluminum (TNOA) (25 wt % in hexane, Sigma Aldrich) was diluted in 22.83 kilogram of hexane. The TNOA solution was stored in a 37.9-liter cylinder under nitrogen blanket. The solution was used for all polymerization runs until about 90% of consumption, then a new batch was prepared. The feed rates of the TNOA solution were adjusted in a range from 0 (no scavenger) to 4 ml per minute to achieve a maximum catalyst activity.

The reactor was first cleaned by continuously pumping solvent (e.g., hexane) and scavenger through the reactor system for at least one hour at a maximum allowed temperature (about 150° C.). After cleaning, the reactor was heated/cooled to the desired temperature using a water/steam mixture flowing through the reactor jacket and controlled at a set pressure with controlled solvent flow. Monomers and catalyst solutions were then fed into the reactor when a steady state of operation was reached. An automatic temperature control system was used to control and maintain the reactor at a set temperature. Onset of polymerization activity was determined by observations of a viscous product and lower temperature of water-steam mixture. Once the activity was established and the system reached equilibrium, the reactor was lined out by continuing operation of the system under the established condition for a time period of at least five times of mean residence time prior to sample collection. The resulting mixture, containing mostly solvent, polymer and unreacted monomers, was collected in a collection box after the system reached a steady state operation. The collected samples were first air-dried in a hood to evaporate most of the solvent, and then dried in a vacuum oven at a temperature of about 90° C. for about 12 hours. The vacuum oven dried samples were weighed to obtain yields. All the reactions were carried out at a pressure of about 2.41 MPa-g. The detailed polymerization condition and some product properties are listed in Table 1A and the C-13 NMR data for polymer products are listed in Table 1B.

TABLE 1A

|  | Run No. | |
| --- | --- | --- |
|  | 1-1 | 1-2 |
| Polymerization temperature (° C.) | 100 | 100 |
| Propylene feed rate (g/min) | 14 | 14 |
| Hexene-1 feed rate (ml/min) | 1.5 | 1.8 |
| Catalyst feed rate (mol/min) | 9.45E−07 | 9.45E−07 |
| Hexane flow rate (ml/min) | 80 | 80 |
| Tm (° C.) | 101 | 104 |
| Tc (° C.) | 52 | 62 |
| Tg (° C.) |  | −13 |
| Heat of fusion (J/g) | 49 | 55.11 |
| Mn (kg/mol) | 5 |  |
| Mw (kg/mol) | 30.53 |  |
| Mz (kg/mol) | 63.129 |  |
| MWD | 5.92 |  |
| Viscosity @ 190° C. (mPa · sec) |  | 628 |
| Tensile strength (MPa) |  | 14.6 |
| Elongation at break (%) |  | 295 |
| Modulus (MPa) |  | 195.2 |
| Toughness (megajoule/m$^3$) |  | 34.8 |
| Copolymer hexene content (wt %) | 8.1 | 8.1 |

TABLE 1B

C-13 NMR Data for polymers produced in Example 1

|  | Run No. | |
| --- | --- | --- |
|  | 1-1 | 1-2 |
| Triad | Mole Fraction | |
| [HHH] | 0.002 | 0.002 |

TABLE 1B-continued

C-13 NMR Data for polymers produced in Example 1

|  | Run No. | |
|---|---|---|
|  | 1-1 | 1-2 |
| [HHP] | 0.006 | 0.006 |
| [PHP] | 0.034 | 0.034 |
| [HPH] | 0.000 | 0.000 |
| [HPP] | 0.101 | 0.101 |
| [PPP] | 0.857 | 0.857 |
| Regios per 10,000 Units | | |
| 2,1 erythro | 8 | 9 |
| 2,1 threo | 0 | 0 |
| 1,3 insertions | 28 | 23 |
| End Groups per 10,000 Units | | |
| Butyl | 3 | 4 |
| Propyl | 29 | 28 |
| Isobutyl | 43 | 33 |
| Vinylidene | 0 | 28 |
| Trisub. | 9 | 13 |
| Hexene Composition | | |
| Wt (%) | 8.1 | 8.1 |

A number of hot melt adhesives were prepared by blending the polymers produced in Runs 1-1 and 1-2 with one or more of functionalized additives, tackifier, wax, antioxidant, and other ingredients under low shear mixing at elevated temperatures to form fluid melts. The mixing temperature varied from about 130 to about 190° C. As examples, Tables 1C and 1D below list the detailed formulation and the properties of the resulting blends. In Tables 1C and 1D, MAPP40 is a maleic anhydride modified polypropylene, having an acid number of 50, a viscosity of 300 mPa sec. at 190° C., a softening point of 149° C., available from Chusei, USA., and MA-POA is a functionalized propylene based adhesive composition produced according to the procedure described in WO2005105868. The prefunctionalized polymer has Mn/Mw/Mz of 20.7/40.6/72.5 kg/mole, a heat of fusion of 29.5 J/g, and a melting peak temperature of 132° C. The mealated polymer contains 1.41 wt % of maleic anhydride. Sasol C80 wax is a Fischer-Tropsch wax obtained from Moore and Munger., and Escomer H101 is functionalized wax supplied by ExxonMobil Chemicals, Houston, Tex. All the adhesion tests were conducted at ambient condition unless otherwise noted. The formulations are listed in weight percent unless otherwise noted. The fiber tear was tested on Inland paper board unless otherwise noted. These Examples demonstrate that adhesives with good adhesion at room temperature and −18° C., as well as short set time (<3 seconds), could be achieved using a formulation comprising the present propylene copolymer with very low viscosity and small quantities (<20 wt %) of additives.

TABLE 1C

Adhesive performance obtained using Dot T-Peel test on Inland board

|  | Adhesive formulation No. | | | |
|---|---|---|---|---|
|  | 1-1 | 1-2 | 1-3 | 1-4 |
| Run No. 1-1 polymer (wt %) | 85 | 85 | 85 | 85 |
| MAPP40 (wt %) | 10 | 10 | 0 | 0 |
| MA-POA (wt %) | 0 | 0 | 10 | 10 |
| C80 wax (wt %) | 5 | 0 | 5 | 0 |
| Escomer H101 (wt %) | 0 | 5 | 0 | 5 |
| Viscosity at 160° C. (mPa sec) | 1200 | 1200 | 1200 | 1200 |

TABLE 1C-continued

Adhesive performance obtained using Dot T-Peel test on Inland board

|  | Adhesive formulation No. | | | |
|---|---|---|---|---|
|  | 1-1 | 1-2 | 1-3 | 1-4 |
| Set time (sec) | 1.5 | 1.5 | 1 | 2 |
| Viscosity at 190° C. (mPa · sec) | 507 | 515 | 550 | 496 |
| Fiber tear at room temperature (%) | >90 | >90 | >90 | <70 |
| Fiber tear at −2° C. (%) | >90 | >90 | >90 | <70 |
| Fiber tear at −18° C. (%) | >90 | <70 | >90 | <70 |

TABLE 1D

Adhesive performance obtained using Dot T-Peel on Inland board

|  | Adhesive formulation No. | | | | | |
|---|---|---|---|---|---|---|
|  | 1-5 | 1-6 | 1-7 | 1-8 | 1-9 | 1-10 |
| Run No. 1-2 Polymer (wt %) | 90 | 90 | 89 | 88 | 85 | 85 |
| MAPP40 (wt %) | 0 | 0 | 0 | 0 | 10 | 0 |
| MA-POA (wt %) | 5 | 4 | 5 | 5 | 0 | 10 |
| C80 wax (wt %) | 5 | 6 | 6 | 7 | 5 | 5 |
| Set time (sec.) | 2.5 | 2.5 | 3 | 2 | 2.5 | 2 |
| Viscosity at 160° C. (mPa sec) | na | na | na | na | 1090 | 1250 |
| Viscosity at 190° C. (mPa sec) | 650 | 605 | 680 | 571 | na | na |
| Fiber tear at room temperature (%) | 85 | 10 | 40 | 0 | 94 | 95 |
| Fiber tear at −2° C. (%) | 88 | 10 | 0 | 0 | 95 | 95 |
| Fiber tear at −18° C. (%) | 65 | 5 | 5 | 0 | 90 | 95 |

Example 2

Propylene copolymers in Example 2 were produced following the same procedure as described in Example 1. Detailed conditions and some properties data are listed in Table 2A. Runs #2-1 and 2-12 are comparative examples. They were produced under similar conditions as the other runs in Example 2 except that there was no 1-hexene fed into the reactor for these two runs. Polymer produced in Run #2-1 was too brittle for tensile testing. The specimen broke in the grip. Tensile testing for polymer produced in Run #2-2 and Run #2-3 were conducted on a Type V specimen defined in ASTM D 638-03 (0.25 inch wide and 0.146 inch thick). Tensile testing for polymer produced in Run #2-11 and 2-12 were conducted on a Type I specimen defined in ASTM D 638-03 (0.5 inch wide and 0.0745 inch thick). Significant improvements in mechanical properties such as elongation and toughness for propylene copolymers with 1-hexene as compared with polypropylene homopolymer at similar viscosity are revealed in this table. This is especially true for polymers with low viscosity (<800 mPa·sec). Good mechanical properties at this low viscosity copolymer allow adhesives with less additives to be made without sacrificing their cohesive strength.

The copolymers with higher viscosity are good for adhesive applications where strong mechanical strength is required such as woodworking, disposables and elastic attachment.

TABLE 2A

| | Run # | | | | | |
|---|---|---|---|---|---|---|
| | 2-1 | 2-2 | 2-3 | 2-4 | 4-5 | 2-6 |
| Polymerization temperature (° C.) | 100 | 100 | 100 | 100 | 100 | 100 |
| Propylene feed rate (g/min) | 14 | 14 | 14 | 14 | 14 | 14 |
| Hexene-1 feed rate (ml/min) | 0 | 1 | 2 | 3 | 4 | 5 |
| Hexane (ml/min) | 80 | 80 | 80 | 80 | 80 | 80 |
| Catalyst feed rate (mol/min) | 1.18E−06 | 1.18E−06 | 1.2E−06 | 1.18E−06 | 1.2E−06 | 1.2E−06 |
| Yield (g/min.) | 14.1 | 14.6 | 15.1 | 15.9 | 16.4 | 17.5 |
| Copolymer hexene content (wt %) | 0 | 3.92 | | 11.3 | | 18.7 |
| Tm (° C.) | 134.2 | 120.4 | 106.9 | 95.9 | 84.3 | 73.9 |
| Tc (° C.) | 95.0 | 75.6 | 51.3 | 38.2 | 16.1 | 3.9 |
| Tg (° C.) | | | −10.7 | −11.4 | −14.3 | −21.3 |
| Heat of fusion (J/g) | 78.0 | 68.8 | 54.2 | 49.1 | 33.5 | 28.6 |
| Viscosity @ 190° C. (mPa sec) | 580.0 | 565.0 | 775.0 | 625.0 | 685.0 | 732.5 |
| Elongation at break (%) | | 1.9 | 5.57 | 747.8 | 723.7 | 958.9 |
| Tensile strength (MPa) | | 0.41 | 0.744 | 10.2 | 14.8 | 14.7 |
| Toughness (megajoule/m$^3$) | | 1.41 | 7.41 | 435.7 | 817.9 | 952.5 |

| | Run # | | | | | |
|---|---|---|---|---|---|---|
| | 2-7 | 2-8 | 2-9 | 2-10 | 2-11 | 2-12 |
| Polymerization temperature (° C.) | 80 | 80 | 80 | 80 | 80 | 80 |
| Propylene feed rate (g/min) | 14 | 14 | 14 | 14 | 14 | 14 |
| Hexene-1 feed rate (ml/min) | 5 | 4 | 3 | 2 | 1 | 0 |
| Hexane (ml/min) | 80 | 80 | 80 | 80 | 80 | 80 |
| Catalyst feed rate (mol/min) | 9.4E−07 | 9.4E−07 | 9.4E−07 | 9.4E−07 | 9.4E−07 | 9.4E−07 |
| Yield (g/min.) | 18.2 | 17.6 | 16.0 | 15.5 | 14.8 | 14.3 |
| Copolymer hexene content (wt %) | 17.9 | | 12.4 | | 3.7 | 0 |
| Tm (° C.) | 79.0 | 85.6 | 99.0 | 113.2 | 129.2 | 146.8 |
| Tc (° C.) | 13.9 | 20.8 | 44.1 | 65.5 | 85.1 | 105.4 |
| Tg (° C.) | −17.1 | −19.7 | −14.3 | −7.3 | −4.5 | — |
| Heat of fusion (J/g) | 30.8 | 35.8 | 50.5 | 56.3 | 73.8 | 90.1 |
| Viscosity @190° C. (mPa sec) | 22400.0 | 15220.0 | 14300.0 | 10560.0 | 8850.0 | 6000.0 |
| Elongation at break (%) | 1452.4 | 1232.2 | 1053.8 | 1003.6 | 6.07 | 1.93 |
| Tensile strength (MPa) | 30.0 | 28.2 | 29.1 | 27.8 | 20.93 | 6.73 |
| Toughness (megajoule/m$^3$) | 1520.1 | 1817.4 | 1525.6 | 1664.2 | 485.5 | 12.78 |

A number of hot melt adhesives were prepared by blending the polymer produced in Example 2 with one or more of functionalized additives, wax, antioxidant, and other ingredients under low shear mixing at elevated temperatures to form fluid melt. The mixing temperature varied from about 130 to about 190° C. As examples, Tables 2B and 2C below list the detailed formulation and the properties of blends. All the adhesion tests were conducted at ambient condition unless otherwise noted. The formulations are listed in weight percent unlike otherwise noted. The fiber tear was tested on Inland paper board. All of these adhesives were produced using 8 wt. % of other ingredients. Adhesive formulations 2-1 and 2-2 are comparative examples and were produced using homopolypropylene as base polymers. The adhesive properties for propylene copolymers were significantly improved as compared with those for the propylene homopolymer. Also good adhesion was obtained by using copolymers having high 1-hexene content, but the set time was longer. The desired balance of adhesive properties and mechanical strength for the present adhesives can be achieved by varying the 1-hexene content, polymer viscosity (or molecular weight) as well as by the addition of other ingredients.

TABLE 2B

| | Adhesive formulation No. | | | | | |
|---|---|---|---|---|---|---|
| | 2-1 | 2-2 | 2-3 | 2-4 | 2-5 | 2-6 |
| Polymer produced in Example 2 | run no 2-1 | run no 2-1 | run no 2-2 | run no 2-2 | run no 2-3 | run no 2-3 |
| Polymer (wt. %) | 92 | 100 | 92 | 100 | 92 | 100 |
| C80 wax (wt. %) | 5 | 0 | 5 | 0 | 5 | 0 |
| MAPP 40 (wt. %) | 2 | 0 | 2 | 0 | 2 | 0 |

TABLE 2B-continued

| | Adhesive formulation No. | | | | | |
|---|---|---|---|---|---|---|
| | 2-1 | 2-2 | 2-3 | 2-4 | 2-5 | 2-6 |
| Irganox 1010 (wt. %) | 1 | 0 | 1 | 0 | 1 | 0 |
| Set time (second) | 2.75 | 3.5 | 2.5 | 5.5 | 2.5 | >6 |
| Fiber tear at room temperature (%) | 0 | 0 | 69 | 0 | 98 | 0 |
| Fiber tear at 2° C. (%) | 0 | 0 | 89 | 0 | 89 | 0 |
| Fiber tear at −18° C. (%) | 0 | 0 | 73 | 0 | 70 | 0 |
| Hardness (Shore A) | 98 | 98 | 98 | 99 | 99 | 98 |

TABLE 2C

| | Adhesive formulation No. | | | | | |
|---|---|---|---|---|---|---|
| | 2-7 | 2-8 | 2-9 | 2-10 | 2-11 | 2-12 |
| Polymer produced in Example 2 run no | run no 2-4 | run no 2-4 | run no 2-5 | run no 2-5 | run no 2-6 | Run no 2-6 |
| Polymer (wt. %) | 92 | 100 | 92 | 100 | 92 | 100 |
| C80 wax (wt. %) | 5 | 0 | 5 | 0 | 5 | 0 |
| MAPP 40 (wt. %) | 2 | 0 | 2 | 0 | 2 | 0 |
| Irganox 1010 (wt. %) | 1 | 0 | 1 | 0 | 1 | 0 |
| Set time (second) | 3 | >6 | 4 | >6 | 5 | >6 |
| Fiber tear at room temperature (%) | 100 | 0 | 100 | 38 | 98 | 0 |
| Fiber tear at 2° C. (%) | 97 | 0 | 97 | 5 | 99 | 75 |
| Fiber tear at −18° C. (%) | 92 | 0 | 28 | 0 | 99 | 40 |
| Hardness (Shore A) | 98 | 97 | 94 | 95 | 87 | 83 |

What we claim is:

1. An adhesive comprising:
a copolymer comprising at least 80 wt % of units derived from propylene and from about 1 to about 12 wt % of units derived from a $C_6$ to $C_{10}$ alpha-olefin;
wherein the copolymer is produced in a single polymerization zone using a single polymerization catalyst;
wherein the copolymer has a weight average molecular weight of at least 10,000 and less than 50,000, a heat of fusion between 10 and 70 J/g and a weight average molecular weight/number average molecular weight ratio of between 4 and 9; and
optionally up to 20 wt % of at least one additive selected from waxes and functionalized polyolefins;
wherein the adhesive has the following properties:
at least 50% fiber tear at −18° C. using Inland paper board as a substrate;
a viscosity of less than 1000 mPa-sec at 190° C.;
a set time of less than 4 seconds; and
a toughness of at least 3.4 megajoules/m$^3$.

2. The adhesive of claim 1 further comprising a tackifier.

3. The adhesive of claim 2, wherein the tackifier is selected from aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, and hydrogenated rosin esters.

4. The adhesive of claim 1, wherein said copolymer has a heat of fusion between 10 and 60 J/g.

5. The adhesive of claim 1, wherein said copolymer has a heat of fusion between 20 and 50 J/g.

6. The adhesive of claim 1, wherein said adhesive has a Shear Adhesion Fail Temperature (SAFT) of at least 110° C.

7. The adhesive of claim 1, wherein said adhesive has a set time of less than 3 seconds.

8. The adhesive of claim 1, wherein said $C_6$ to $C_{10}$ alpha-olefin comprises hexene-1 or octene-1.

9. The adhesive of claim 1, wherein said functionalized polyolefin comprises maleated polypropylene.

10. An adhesive comprising:
a copolymer comprising at least 80 wt. % of units derived from propylene and from about 1 to about 12 wt. % of units derived from a $C_6$ to $C_{10}$ alpha-olefin;
wherein said copolymer is produced in a single polymerization zone using a single polymerization catalyst;
wherein said copolymer has a viscosity at 190° C. in the range from 1000 to 10,000 mPa-sec a weight averaged molecular weight less than 100,000, a heat of fusion between 10 and 70 J/g, a weight average molecular weight/number average molecular weight ratio of between 4 and 9; and wherein the adhesive has the following properties:
at least 50% fiber tear at −18° C. using Inland paper board as a substrate;
a viscosity at 190° C. of from at least 1000 up to 10,000 mPa-sec;
a set time of less than 4 seconds;
a toughness of at least 7 megajoule/m$^3$; and
an elongation of at least 100%.

11. The adhesive of claim 10, wherein said copolymer has a weight averaged molecular weight of less than 80,000.

12. The adhesive of claim 10, further comprising a functionalized polyolefin.

13. An adhesive comprising:
a copolymer comprising at least 80 wt. % of units derived from propylene and from about 2 to about 12 wt. % of units derived from a $C_6$ to $C_{10}$ alpha-olefin;
wherein said copolymer is produced in a single polymerization zone using a single polymerization catalyst;
wherein said copolymer has a viscosity at 190° C. in the range from 10,000 to 50,000 mPa-sec a weight averaged molecular weight less than 100,000, a heat of fusion between 10 and 70 J/g, a weight average molecular weight/number average molecular weight ratio of between 4 and 9; and
wherein the adhesive has the following properties:
at least 50% fiber tear at −18° C. using Inland paper board as a substrate;
a viscosity at 190° C. of from at least 10,000 up to 50,000 mPa-sec;
a set time of less than 4 seconds;
a toughness of at least 14 megajoules/m$^3$; and
an elongation of at least 400%.

14. The adhesive of claim 13, wherein said copolymer has a weight averaged molecular weight of at least 50,000.

15. The adhesive of claim 13, wherein said copolymer has a viscosity at 190° C. of less than 25,000 mPa-sec.

16. The adhesive of claim 13, further comprising a functionalized polyolefin.

* * * * *